US011460928B2

(12) United States Patent
Park et al.

(10) Patent No.: US 11,460,928 B2
(45) Date of Patent: Oct. 4, 2022

(54) ELECTRONIC DEVICE FOR RECOGNIZING GESTURE OF USER FROM SENSOR SIGNAL OF USER AND METHOD FOR RECOGNIZING GESTURE USING THE SAME

(71) Applicant: Samsung Electronics Co., Ltd., Gyeonggi-do (KR)

(72) Inventors: Sungjin Park, Gyeonggi-do (KR); Cheolo Kim, Gyeonggi-do (KR); Taeyoon Kim, Gyeonggi-do (KR); Jinyoup Ahn, Gyeonggi-do (KR); Chaiman Lim, Gyeonggi-do (KR); Wonjoon Cho, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 47 days.

(21) Appl. No.: 17/116,074

(22) Filed: Dec. 9, 2020

(65) Prior Publication Data
US 2021/0191522 A1 Jun. 24, 2021

(30) Foreign Application Priority Data
Dec. 18, 2019 (KR) .................. 10-2019-0170152

(51) Int. Cl.
*G06F 3/01* (2006.01)
(52) U.S. Cl.
CPC .............. *G06F 3/017* (2013.01); *G06F 3/015* (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| 9,396,642 | B2 | 7/2016 | He et al. |
| 9,396,643 | B2 | 7/2016 | He et al. |
| 9,977,509 | B2 | 5/2018 | Park et al. |

(Continued)

FOREIGN PATENT DOCUMENTS

| KR | 10-2017-0061428 A | 6/2017 |
| KR | 10-2018-0010062 A | 1/2018 |

(Continued)

OTHER PUBLICATIONS

International Search Report dated Mar. 25, 2021.

*Primary Examiner* — William Lu
(74) *Attorney, Agent, or Firm* — Cha & Reiter, LLC

(57) ABSTRACT

Aspects of the disclosure include an electronic device comprising: a sensor device including at least one biometric sensor; memory storing a table of a plurality of gestures, wherein for each gesture, a corresponding plurality of features are stored in the memory; and at least one processor operatively connected to the sensor device and the memory, wherein the at least one processor is configured to: obtain a bio-signal of a user from the at least one biometric sensor; select a section of the bio-signal that includes one feature of the corresponding plurality of features for the plurality of gestures; determine a specific one of the plurality of gestures based on the one feature included in the section of the bio-signal and the corresponding plurality features for the plurality of gestures.

17 Claims, 14 Drawing Sheets

(56) References Cited

U.S. PATENT DOCUMENTS

| | | |
|---|---|---|
| 10,348,355 B2 | 7/2019 | Camacho Perez et al. |
| 10,520,378 B1* | 12/2019 | Brown ................. A61B 5/7267 |
| 2004/0068409 A1* | 4/2004 | Tanaka ................. B25J 9/1656 |
| | | 704/272 |
| 2009/0265671 A1* | 10/2009 | Sachs ................... G06F 3/0346 |
| | | 715/863 |
| 2010/0106044 A1* | 4/2010 | Linderman .......... A61B 5/7264 |
| | | 600/546 |
| 2014/0143064 A1* | 5/2014 | Tran ...................... A61B 5/021 |
| | | 705/14.66 |
| 2014/0278139 A1* | 9/2014 | Hong ................... A61B 5/6801 |
| | | 702/19 |
| 2015/0072326 A1* | 3/2015 | Mauri .................. A61B 5/6804 |
| | | 434/247 |
| 2015/0109124 A1 | 4/2015 | He et al. |
| 2015/0112154 A1 | 4/2015 | He et al. |
| 2015/0112606 A1 | 4/2015 | He et al. |
| 2016/0263458 A1* | 9/2016 | Mather ................ G06K 9/0055 |
| 2017/0075426 A1* | 3/2017 | Camacho Perez ....... H04B 1/40 |
| 2017/0147077 A1* | 5/2017 | Park ........................ G06F 3/017 |
| 2017/0188971 A1* | 7/2017 | Liu ..................... A61B 5/7267 |
| 2017/0209055 A1* | 7/2017 | Pantelopoulos ..... A61B 5/7203 |
| 2017/0220923 A1* | 8/2017 | Bae ......................... G06N 3/08 |
| 2017/0259167 A1* | 9/2017 | Cook .................... A63F 13/212 |
| 2017/0312614 A1* | 11/2017 | Tran ....................... G16H 50/20 |
| 2018/0020990 A1* | 1/2018 | Park ..................... A61B 5/7282 |
| | | 600/301 |
| 2018/0314879 A1* | 11/2018 | Khwaja ................ A61B 5/0295 |
| 2019/0113973 A1* | 4/2019 | Coleman ............... G16H 50/20 |
| 2020/0245873 A1* | 8/2020 | Frank ................... A61B 5/0823 |
| 2020/0301509 A1* | 9/2020 | Liu ........................ G06F 3/015 |
| 2021/0117523 A1* | 4/2021 | Kim ....................... G06F 3/017 |

FOREIGN PATENT DOCUMENTS

| | | |
|---|---|---|
| KR | 10-2018-0086767 A | 8/2018 |
| KR | 10-1890513 B1 | 8/2018 |
| KR | 10-1986246 B1 | 6/2019 |

\* cited by examiner

ELECTRONIC DEVICE FOR RECOGNIZING GESTURE OF USER FROM SENSOR SIGNAL OF USER AND METHOD FOR RECOGNIZING GESTURE USING THE SAME

CROSS-REFERENCE TO RELATED APPLICATION(S)

This application is based on and claims priority under 35 U.S.C. § 119 to Korean Patent Application No. 10-2019-0170152, filed on Dec. 18, 2019, in the Korean Intellectual Property Office, the disclosure of which is incorporated by reference herein its entirety.

BACKGROUND

1. Field

The disclosure relates to an electronic device capable of recognizing a gesture of a user using a sensor signal sensed from the user.

2. Description of Related Art

Electronic devices having touchscreens detect touch inputs to interact with the display. In addition to touch inputs, touchscreens detect gestures, which involve multiple touch inputs. Moreover, electronic devices can interpret each of the touch inputs as a single gesture, as opposed to independent touches. Based on the gesture, the electronic device can perform different operations.

Electronic devices include both smartphones and wearable devices. It is important to provide a user friendly input mechanism for wearable devices.

The above information is presented as background information only to assist with an understanding of the disclosure. No determination has been made, and no assertion is made, as to whether any of the above might be applicable as prior art with regard to the disclosure.

SUMMARY

Aspects of the disclosure include an electronic device comprising: a sensor device including at least one biometric sensor; memory storing a table of a plurality of gestures, wherein for each gesture, a corresponding plurality of features are stored in the memory; and at least one processor operatively connected to the sensor device and the memory, wherein the at least one processor is configured to: obtain a bio-signal of a user from the at least one biometric sensor; select a section of the bio-signal that includes one feature of the corresponding plurality of features for the plurality of gestures; determine a specific one of the plurality of gestures based on the one feature included in the section of the bio-signal and the corresponding plurality features for the plurality of gestures.

Aspects of the disclosure include a method for recognizing a gesture performed by an electronic device, the method comprising: sensing a sensor signal from a user; storing a table of a plurality of gestures, wherein for each gesture, a corresponding plurality of features are stored; setting a crossing point between the sensor signal and a preset reference line and a transition point of the sensor signal; segmenting the sensor signal using at least one of the crossing point and the transition point; selecting a section of the sensor signal that includes one feature of the corresponding plurality of features for the plurality of gestures; and determining a specific one of the plurality of gestures based on the one feature included in the segment and the corresponding plurality features for the plurality of gestures.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With respect to the description of the drawings, the same or similar reference numerals may be used for the same or similar components.

DETAILED DESCRIPTION

Hereinafter, certain embodiments of the disclosure may be described with reference to accompanying drawings. However, this is not intended to limit the disclosure to a specific embodiment, and is to be understood as including various modifications, equivalents, and/or alternatives of the embodiment of the disclosure.

Among user interface technologies, technology for recognizing gestures of a user may use an image obtained from an image sensor or an inertial measurement unit (IMU) such as an acceleration sensor and a gyro sensor.

In particular, the scheme of recognizing the gesture using the inertial measurement unit may have a higher degree of freedom compared to the scheme using the image in that it may be applied to a wearable device.

To recognize the gesture using sensors attached to the wearable device, noise may be removed from continuously sensed sensor signals. This allows cutting a gesture section by predicting a start point and an end point of the gesture section. Further, time series data of the gesture section may be used to recognize the gesture.

Time series data can be extracted from a sensor signal and may be input into an input layer of a deep learning network, for example, a neural network, a feature value for the corresponding time series data may be extracted from a hidden layer (e.g., a convolution layer in the deep learning network), and a gesture may be distinguished in an output layer.

However, when the number of hidden layers is not large, it is not very complicated in terms of an amount of operation. However, when the number of hidden layers is increased for more accurate gesture recognition, as the amount of operation for gesture recognition increases, a high-level performance may be required for an electronic device that performs the gesture recognition method.

Therefore, the foregoing may be difficult to be applied in an environment, such as a wearable device, since wearable devices have a relatively low operation ability compared to a smartphone, a tablet PC, a desktop, and the like and using a limited battery.

In addition, when using the deep learning network, because it is impossible to accurately analyze which work was performed inside the deep learning network, there may be difficulties in commercializing a product in that there is no choice but to predict which work was performed.

Certain embodiments disclosed in the disclosure may provide an electronic device that recognizes a gesture of a user from a sensor signal such that even when the wearable device has lower battery capacity and limited operations by a processor, the electronic device may accurately recognize the gesture performed by the user.

Figure 1:
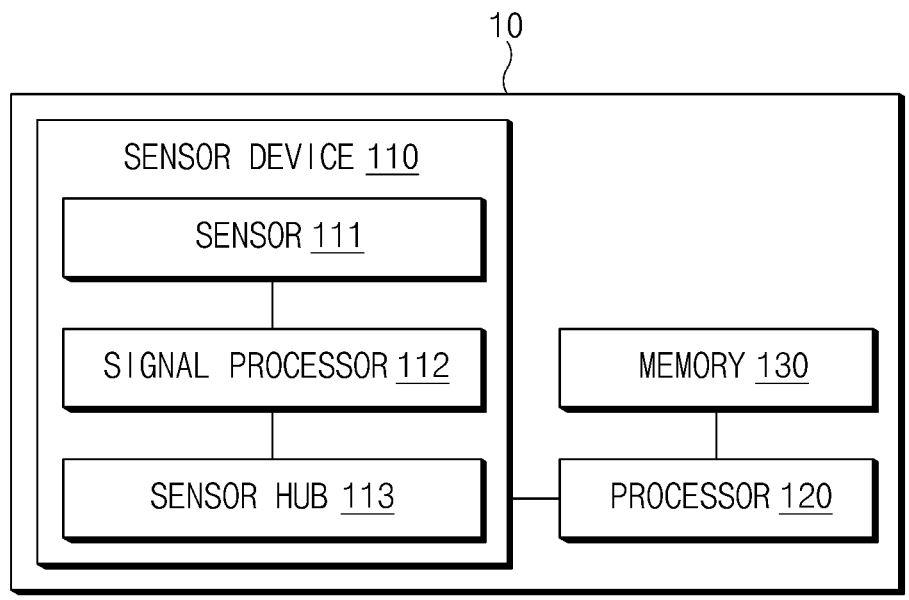
FIG. 1 is a diagram illustrating an electronic device according to an embodiment.

FIG. 1 is a diagram illustrating an electronic device 10 (e.g., an electronic device 1401 in FIG. 14) according to an embodiment.

Figure 14:
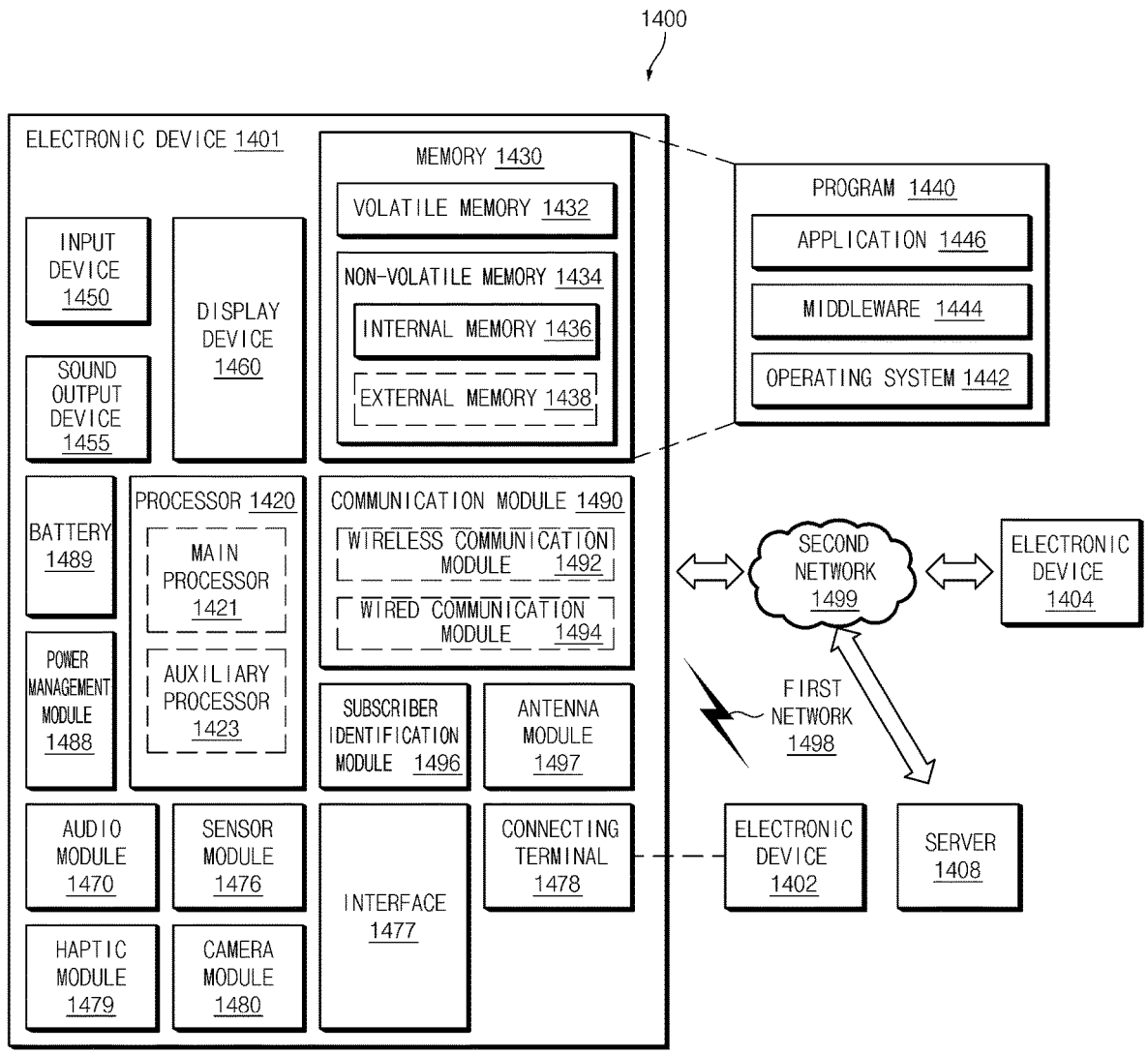
FIG. 14 illustrates an electronic device in a network environment according to an embodiment.

Referring to FIG. 1, the electronic device 10 according to an embodiment may include a sensor device 110 (e.g., a sensor module 1476 or a sensor circuit in FIG. 14), a processor 120 (e.g., a processor 1420 in FIG. 14), and a memory 130 (e.g., a memory 1430 in FIG. 14). The electronic device 10 according to the embodiment may be a wearable device, but may not be limited thereto, and may be a portable terminal such as a smart phone, a tablet, or the like, a patch, a sticker type device, or an implantable device. The term "processor" shall be understood to refer to the singular and plural contexts.

In an embodiment, the sensor device 110 may be disposed in at least a portion of a housing of the electronic device 10 (e.g., a housing of the wearable device), and may sense a user input. A sensor signal is an electrical signal, that is generally expressed as either the instantaneous current or voltage value (now referred to as value) at particular times. A reference line is a preset value. As a function of time, the preset value appears as a horizontal line, thus a preset reference line. A crossing point is the instant in time when value of the sensor signal changes from below the preset reference line to above the preset reference line and vice versa. A transition point is when the slope of the sensor signal changes from positive to negative, or vice versa. The sensor device 110 may set a crossing point between the sensor signal and a preset reference line and a transition point of the sensor signal in the sensor signal sensed from the user. The sensor device 110 may then segment the sensor signal using at least one of the crossing point and the transition point. To this end, the sensor device 110 may include a sensor 111, a signal processor 112 (or a signal processing circuit), and a sensor hub 113 (or a hardware processor for controlling the sensor).

In an embodiment, the sensor 111 may sense the sensor signal (e.g., an acceleration signal, an angular velocity signal, a geomagnetic signal, a photoplethysmography (PPG) signal, and the like) from the user. For example, the sensor 111 may include at least one of an acceleration sensor, a PPG sensor, a gyro sensor, a geomagnetic sensor, and an electrocardiogram sensor.

In an embodiment, the signal processor 112 may process the sensor signal sensed from the sensor 111. For example, the signal processor 112 may perform a pre-processing operation, a compensation operation, a validation determination operation, an operation of setting the crossing point and the transition point, and a sensor signal segmentation operation based on the crossing point and the transition point of the sensor signal.

In certain embodiments, the signal processor 112 may perform the pre-processing operation of the sensor signal to perform filtering of the sensor signal (e.g., sensor signal filtering using a bandpass filter). For example, in the process of sensing the sensor signal of the user, the signal processor 112 may remove a noise signal generated by an operation not intended by the user other than a gesture operation and filter only a region of the signal corresponding to a gesture section of the user, and may compensate for a sampling rate when necessary.

In an embodiment, the signal processor 112 may perform the compensation operation of the sensor signal to compensate for a signal section (e.g., a section in which an intensity of the signal rises to be equal to or above a specific value or falls to be equal to or below a specific value during a unit time) requiring the compensation based on an operation and a posture of the user. For example, the signal processor 112 may perform compensation of deleting the section requiring the compensation of the sensor signal.

In certain embodiments, the signal processor 112 may perform the validation determination operation to select a signal valid for gesture recognition among a plurality of sensor signals sensed from a plurality of sensors. For example, the signal processor 112 may determine a sensor signal whose validation determined using at least one of a signal to noise ratio (SNR), pattern analysis of the sensor signal, and comparison between the sensor signals is equal to or above a preset reference value as the signal valid for the gesture recognition.

In an embodiment, the signal processor 112 breaks the continuously input sensor signals into signals of a finite length (sections) through the sensor signal segmentation operation. The signal processor 112 may predict a section that is likely to contain a gesture, and distinguish meaningful signals (e.g., sensor signals including gesture signals) and meaningless signals (e.g., sensor signals not including the gesture signals) from each other, thereby extracting only the meaningful signals (e.g., signals of portions in which the gesture operation is estimated to exist).

In an embodiment, the signal processor 112 may perform the operation of setting the crossing point and the transition point on the sensor signal including the extracted gesture signal to set the crossing point and the transition point in the sensor signal, and may perform the signal segmentation operation to segment the sensor signal using at least one of the crossing point and the transition point.

In an embodiment, the sensor hub 113 may transmit the sensor signal (e.g., the sensor signal segmented based on the sensor signal segmentation operation) processed by the signal processor 112 to the processor 120. In an embodiment, the sensor hub 113 might not transmit a sensor signal determined to be invalid based on the validation determination operation of the signal processor 112 to the processor 120. In an embodiment, when there are a plurality of sensor signals processed through the signal processor 112, the sensor hub 113 may transmit the plurality of sensor signals to the processor 120 sequentially or simultaneously.

In an embodiment, the processor 120 may extract a feature value indicating the gesture of the user using the sensor signal (e.g., a sensor signal whose validation is equal to or above a reference among the segmented sensor signals) transmitted from the sensor hub 113. The processor 120 may recognize the gesture of the user using the extracted feature value.

In an embodiment, the processor 120 may perform all operations (e.g., the pre-processing operation, the compensation operation, the validation determination operation, the operation of setting the crossing point and the transition point, the sensor signal segmentation operation based on the crossing point and the transition point, the feature value extraction operation, the gesture recognition operation, and the like of the sensor signal) performed for the gesture recognition after receiving the sensor signal from the sensor device 110.

In an embodiment, the memory 130 may store various commands or data associated with a control operation of the electronic device 10. The memory 130 may include at least one of a volatile memory and a non-volatile memory, but may not be limited thereto. In an embodiment, the memory 130 may store a gesture set by matching a plurality of gesture operations with functions respectively corresponding to the plurality of gestures, and may store a list (e.g., Table 1) of feature values for each gesture respectively corresponding to types of a plurality of sensors. In an embodiment, the memory 130 may store a gesture classification model that outputs a gesture corresponding to a specific feature value by taking the specific feature value as an input value.

TABLE 1

| Gesture | Maximum value of Fast Fourier Transform coefficient (FFT Max) | Integral value (Integral) | Skewness value (Skewness) | Ratio of maximum value and minimum value of sensor signal (Min max ratio (max/min)) |
| --- | --- | --- | --- | --- |
| Drop operation (DROP) | 1869 | 1.2429e+04 | −0.1691 | 22.6 |
| Lift operation (LIFT) | 300 | 1.3002e+05 | 0.1837 | 0.06 |

TABLE 1-continued

| Gesture | Maximum value of Fast Fourier Transform coefficient (FFT Max) | Integral value (Integral) | Skewness value (Skewness) | Ratio of maximum value and minimum value of sensor signal (Min max ratio (max/min)) |
| --- | --- | --- | --- | --- |
| Flick operation (FLICK) | 1.263e+05 | 1.4265e+07 | 0.3328 | 1.402 |

Referring to Table 1, the electronic device 10 may store the list of the feature values for each gesture as shown in Table 1. When the feature value is extracted, the electronic device 10 may load the previously stored list of the feature values for each gesture from the memory 130 and select the gesture corresponding to the feature value using the loaded list of the feature values for each gesture, thereby recognizing the gesture. For example, when the extracted feature value is a skewness value (Skewness) and the skewness value is 1.3002e+05, the electronic device 10 may recognize that the corresponding feature value is a value indicating a lift operation gesture.

Figure 2B:
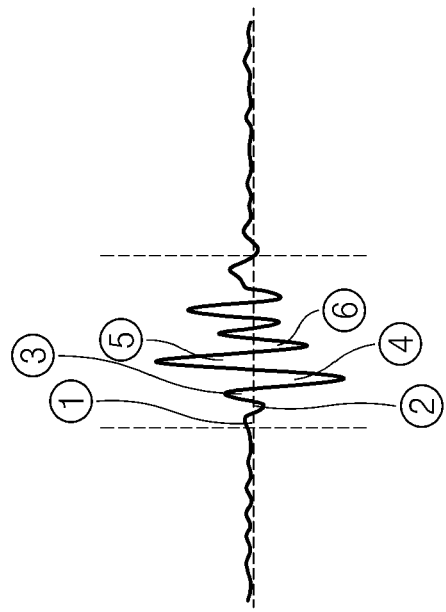
FIG. 2A and FIG. 2B show diagrams showing forms of extracting a feature value from a sensor signal in a recognition method according to a comparative example.
Figure 2A:
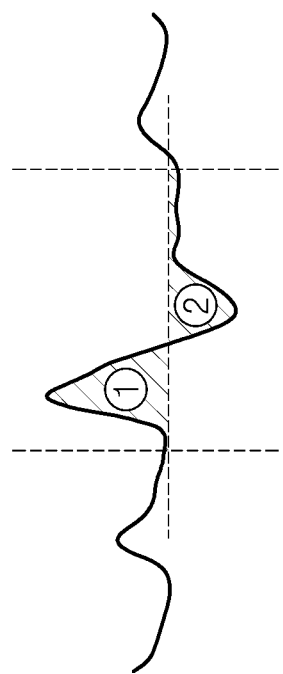
Figure 3:
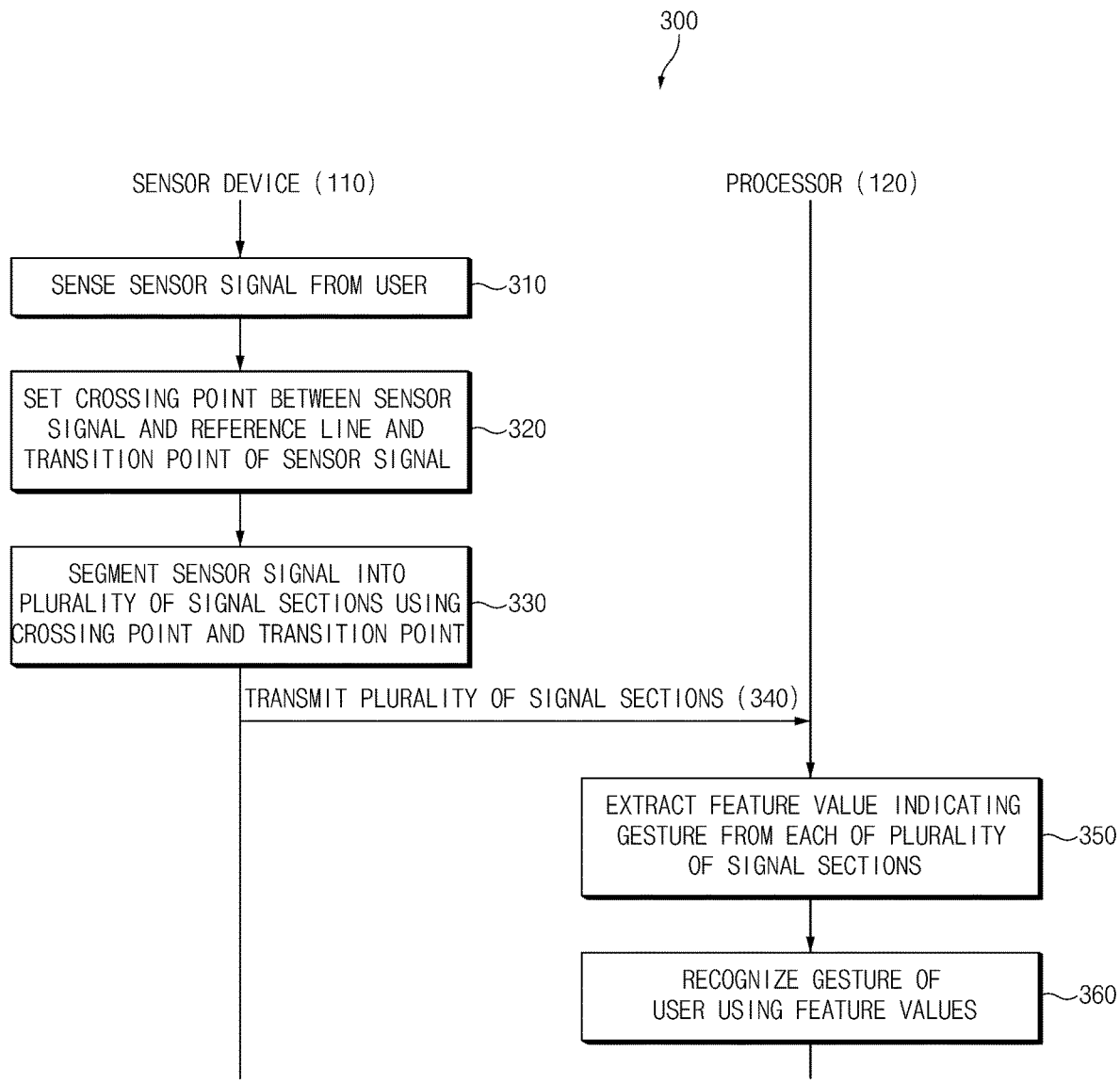
FIG. 3 is a flowchart of a gesture recognition method performed by an electronic device according to an embodiment.

FIG. 2A and FIG. 2B shows diagrams showing forms of extracting a feature value from a sensor signal in a gesture recognition method, and FIG. 3 is a flowchart of a gesture recognition method performed by the electronic device 10 (e.g., the electronic device 10 in FIG. 1 or the electronic device 1401 in FIG. 14) according to an embodiment.

Referring to FIG. 2A, the electronic device may extract the feature value from the PPG signal sensed from the user using a specific gesture recognition method (e.g., a method using an integral value of an entirety of the sensor signal as the feature value). For example, the processor of the electronic device may extract the integral value calculated by integrating the entirety of the gesture signal as the feature value. In this connection, because an integral value of an area ① has a positive value and an integral value of an area ② has a negative value, the integral value decreases as the integral value of the area ① and the integral value of the area ② are added. For example, when the sensor signal exhibits a form of changing from the positive value to the negative value or exhibits a form of changing from the negative value to the positive value, the feature value for recognizing the gesture may not be able to be accurately extracted. This is because the feature value changes by summing feature values of respective sections. For example, when a degree of change of the integral value of the sensor signal from the positive value to the negative value or from the negative value to the positive value is large, a result value derived in the above scheme may distort an original intention or a characteristic value might not be obtained.

Referring to FIG. 2B, in a case of an acceleration signal in which the number of times the sensor signal changes from the positive value to the negative value or from the negative value to the positive value for the same gesture operation is greater than that of the PPG signal, positive sections (e.g., areas ①, ③, and ⑤) and negative sections (e.g., areas ②, ④, and ⑥) for which the integral value is to be calculated increase, so that an amount of operation for extracting one feature value (e.g., the integral value) increases. Further, as the sum of the areas of the respective sections is calculated as the feature value for the gesture, an intention to calculate a frequently changing value as the feature value may not be able to be accurately reflected, so that the feature value indicating the gesture may not be accurately extracted.

Examples of feature values extracted from each area and feature values extracted from a total area by applying a gesture recognition scheme for various feature values extracted from the PPG signal in FIG. 2A are as shown in a Table below.

TABLE 2

|  | Area ① | Area ② | Total area (areas ① and ②) |
|---|---|---|---|
| Integral value (Integral) | 1.4265e+05 | −1.3002e+05 | 1.2429e+04 |
| Skewness value (Skewness) | −0.1691 | 0.1837 | 0.3328 |
| Kurtosis value (kurtosis) | 1.7490 | 1.6129 | 1.7555 |
| Fast Fourier Transform maximum value (FFT max value) | 869 | 729 | 1.263e+03 |
| Amount of change in X value (X-axis difference) | 163 | 179 | 342 |
| Ratio of maximum value and minimum value of sensor signal (Min max ratio (max/min)) | 22.6 | 0.06 | −1.402 |

Referring to Table 2 above, even in a case of extracting another feature value (e.g., the skewness value, the kurtosis value, the Fast Fourier transform maximum value, the amount of change in the x value, and the ratio of the minimum value and the maximum value) extracted from the PPG signal in FIG. 2A using the recognition method according to the comparative example, it may not be possible to extract the accurate feature value because the feature value obtained from the total area (the areas ① and ②) is more difficult to exhibit a feature of the gesture than the feature value obtained from each of the areas ① and ②. In particular, when the skewness value is used, a degree of asymmetry significantly changes depending on which signal section is set as a reference. Because the foregoing gesture recognition method uses the skewness value for the total area, the value may be distorted or an unintended result may be derived in a waveform in which the number of changes between the negative section and the positive section is large. Therefore, subdividing each section and considering each subdivided section individually in the process of extracting the feature value indicating the gesture from the sensor signal, may more accurately recognize the gesture.

The electronic device 10 according to an embodiment may elaborately segment the sensor signal sensed from the user using at least one of the crossing point and the transition point, extract feature values from the segmented sensor signals, respectively, and use the extracted feature values to recognize the gesture performed by the user.

Referring to FIG. 3, according to an embodiment, in operation 310, the sensor device 110 may sense the sensor signal from the user. In an embodiment, the sensor device 110 may include the plurality of sensors of the different types, and may sense the plurality of sensor signals (e.g., the acceleration signal, the PPG signal, a gyro signal, the geomagnetic signal, and an electrocardiogram signal) using the plurality of sensors (e.g., the acceleration sensor, the PPG sensor, the gyro sensor, the geomagnetic sensor, and the electrocardiogram sensor).

According to an embodiment, in operation 320, the sensor device 110 may set or determine the crossing point between the sensor signal sensed in operation 310 and the preset reference line and the transition point of the sensor signal. The reference line may mean a virtual line connecting preset values with each other. For example, when a value of a bio-signal is a raw value, the reference line may mean a line connecting points whose raw values become 0 with each other. Alternatively, when the value of the bio-signal is not the raw value, the specified reference line may mean a line connecting points where values of the bio-signal normalized by the processor become 0 with each other. For example, when the value of the bio-signal is a PPG value, the reference line may mean a line connecting points where values obtained by standardizing or normalizing the PPG value by applying the bandpass filter, a moving average filter, and the like or applying other operations become 0 with each other.

The crossing point may mean a point at which the sensed sensor signal has a preset value. In an embodiment, when the value of the preset reference line (e.g., the value of the sensor) is 0, the sensor device 110 may set a point (e.g., a zero crossing point) at which the reference line with the sensor value of 0 crosses the sensor signal as the crossing point. In an embodiment, the sensor device 110 may sense a change in a slope of the sensor signal, and set a point at which the slope changes from a positive value to a negative value or a point at which the slope changes from the negative value to the positive value as the transition point. For example, the sensor device 110 may sense changes in the values of the sensor signal to set a point at which the value of the sensor signal decreases after increasing or a point at which the value of the sensor signal increases after decreasing as the transition point.

According to an embodiment, in operation 330, the sensor device 110 may segment the sensor signal into a plurality of signal sections using at least one of the crossing point and the transition point set in operation 320. In an embodiment, the sensor device 110 may segment the sensor signal using only the crossing point, or segment the sensor signal using only the transition point. In an embodiment, the sensor device 110 may primarily segment the sensor signal using the crossing point, and secondarily segment the sensor signal that is primarily segmented using the transition point.

According to an embodiment, in operation 340, the sensor device 110 may transmit at least one signal section generated in operation 330 to the processor 120. In an embodiment, the sensor device 110 may select only sensor signals determined to be valid signals through the signal processor 112 among the sensor signals sensed from the sensor 111, and transmit the sensor signals determined to be valid signals to the processor 120 through the sensor hub 113. In an embodiment, the sensor device 110 may transmit all the signals sensed from the sensor 111 to the processor 120 through the sensor hub 113.

According to an embodiment, in operation 350, the processor 120 may extract the feature value indicating the gesture from each of the plurality of signal sections transmitted from the sensor device 110. For example, the processor 120 may extract, from each of the plurality of signal sections, at least one of energy, correlation, entropy, a Fast Fourier Transform coefficient, mean, variance, covariance, a maximum value, a minimum value, a zero crossing point, a length of time series data, skewness, kurtosis, and integral values, autocorrelation, a continuous wavelet transform coefficient, a peak (a local maximum value and a local minimum value), the number of peaks, and entropy of the sensor signal as the feature value.

In an embodiment, the processor 120 extracts the feature values from the plurality of signal sections. The processor 120 may independently extract the feature value from each of the plurality of signal sections. In an embodiment, the processor 120 may define a form of each of the plurality of signal sections using a transition point included in each of the plurality of signal sections, set a sequence of the plurality of signal sections based on the form of each of the plurality of signal sections, and extract the set sequence of the plurality of signal sections as the feature value indicating the gesture of the user. For example, the processor 120 may determine whether each of the plurality of signal sections is concave or convex using the transition point included in each of the plurality of signal sections. The processor 120 may define the sequence of the plurality of signal sections in a binary form by setting a concave signal section as "1" and a convex signal section as "0", and may extract the sequence of the plurality of signal sections defined in the binary form as the feature value indicating the gesture.

According to an embodiment, in operation 360, the processor 120 may recognize the gesture of the user using the feature values extracted in operation 350. For example, the processor 120 may input the feature values extracted in operation 350 into a gesture classification model loaded from the memory 150, select gesture data corresponding to a result value output from the gesture classification model based on the feature value from a preset gesture set to recognize the gesture of the user, and recognize the gesture using the selected gesture data. The electronic device 10 according to an embodiment may subdivide the sensor signal sensed from the user using at least one of the crossing point and the transition point, and extract the feature value indicating the gesture of the user from each of the subdivided signal sections.

In an embodiment, the gesture classification model may be a gesture classification model (e.g., a classifier of a deep learning model) that has previously learned sensor signal information (e.g., an amount of change, a waveform, and the like of the sensor signal) generated as the user performs the gesture, and the gestures respectively corresponding to the sensor signals as learning data. The electronic device 10 may store the gesture classification model in the memory 130, and may update the gesture classification model as the user learns the gesture.

A section of a sensor signal shall be understood to mean the collection of values as a function of time of the sensor signal during a time interval.

Figure 4:
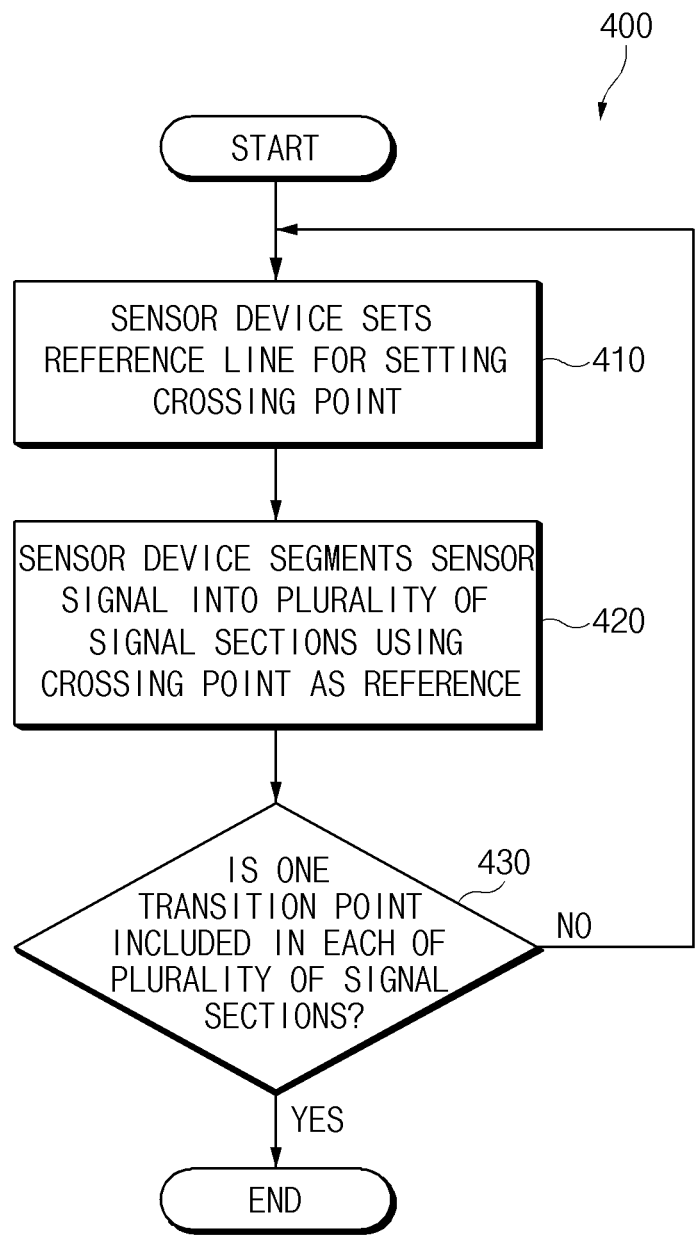
FIG. 4 is a flowchart of a method for segmenting, by an electronic device, a sensor signal using a crossing point.

In FIG. 4, crossing points are used to determine segments of the sensor signal. However, each segment can only have one transition point. If a segment has more than one transition point, the sensor device resets the reference line.

FIG. 4 is a flowchart of a method for segmenting, by the electronic device 10 (the electronic device 10 in FIG. 1 or the electronic device 1401 in FIG. 14), a sensor signal using a crossing point.

In an embodiment, the electronic device 10 may segment the sensor signal using the crossing point. Referring to FIG. 4, according to an embodiment, in operation 410, the sensor device 110 may set a value of the reference line for setting the crossing point in the sensor signal. In an embodiment, the sensor device 110 may set the value of the reference line such that the number of crossing points between the sensor signal and the reference line is equal to or greater than a preset number. In an embodiment, the sensor device 110 segments the sensor signal into the plurality of signal sections using the crossing point. The sensor device 110 may set the value of the preset reference line such that at least one transition point is included in each of the plurality of signal sections.

According to an embodiment, in operation 420, the sensor device 110 may set the point where the sensor signal crosses the reference line set in operation 410 as the crossing point, and segment the sensor signal into the plurality of signal sections based on the set crossing point. For example, when there are three points (e.g., a first crossing point, a second crossing point, and a third crossing point) where the sensor signal crosses the reference line set in operation 410, the sensor device 110 may segment the sensor signal into a first signal section between the first crossing point and the second crossing point, and a second signal section between the second crossing point and the third crossing point.

According to an embodiment, in operation 430, the sensor device 110 may determine whether each of the plurality of signal sections generated in operation 420 includes one transition point. When it is determined that a plurality of transition points are included in one signal section, the sensor device 110 may change the reference line to include one transition point for each of the plurality of signal sections by performing operation 410 again. In an embodiment, when the number of plurality of signal sections is less than the preset number, the sensor device 110 may re-perform operation 410 to change the value of the reference line for setting the crossing point such that the number of plurality of signal sections is equal to or greater than the preset number.

Figure 5:
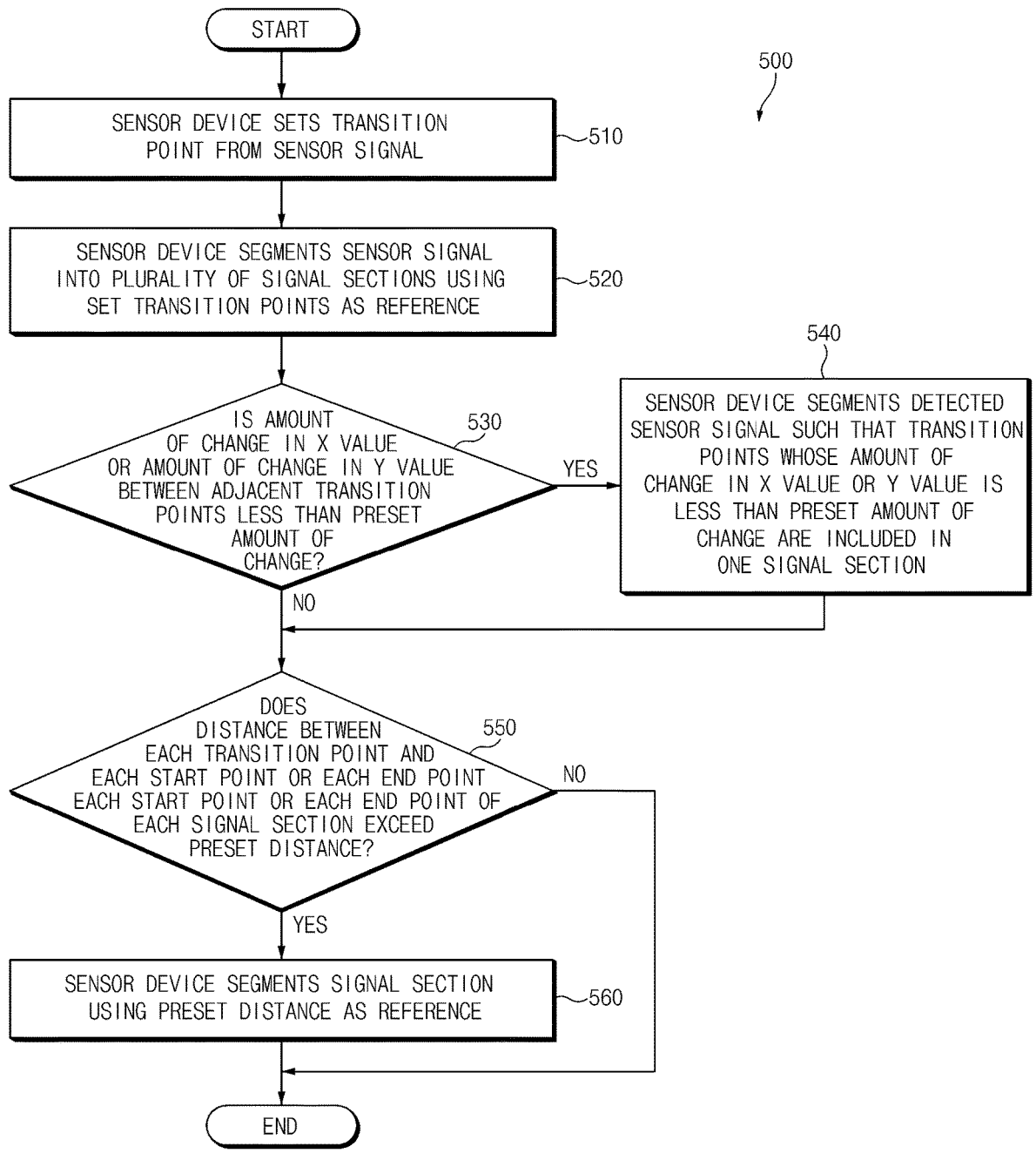
FIG. 5 is a flowchart of a method for segmenting, by an electronic device according to an embodiment, a sensor signal using a transition point.

FIG. 5 is a flowchart of a method for segmenting, by the electronic device 10 (e.g., the electronic device 10 in FIG. 1 or the electronic device 1401 in FIG. 14) according to an embodiment, a sensor signal using a transition point.

In an embodiment, the electronic device 10 may segment the sensor signal using the transition point. Referring to FIG. 5, according to an embodiment, in operation 510, the sensor device 110 may set the transition point from the sensor signal. For example, the sensor device 110 may sense the change in the slope from the sensor signal, and may set the point at which the slope changes from the positive value to the negative value or the point at which the slope changes from the negative value to the positive value as the transition point. For example, the sensor device 110 may set the point at which the value of the sensor signal decreases after increasing or the point at which the value of the sensor signal increases after decreasing as the transition point.

In operation 520, the sensor device 110 may segment the sensor signal into the plurality of signal sections using the transition points set in operation 510 as a reference. In an embodiment, the sensor device 110 may segment the sensor signal such that each of the plurality of transition points is included in a different signal section, using the plurality of transition points set in operation 510.

In operation 530, the sensor device 110 may determine whether an amount of change in an x value or an amount of change in a y value between adjacent transition points among the plurality of transition points is less than a preset amount of change. In an embodiment, the sensor device 110 may determine whether both the amount of change in the x value and the amount of change in the y value between the adjacent transition points are less than the preset amount of change.

When it is determined from operation 530 that the amount of change in the x value or the amount of change in the y value between the adjacent transition points are less than the preset amount of change (530—yes), in operation 540, the sensor device 110 may allow two transition points whose amount of change in the x value or amount of change in the y value is less than the preset amount of change to be included in one signal section. For example, the plurality of transition points may include a first transition point and a second transition point disposed at a position adjacent to the first transition point, and the sensor device 110 may segment the sensor signal such that the first transition point and the second transition point are included in different signal sections. In this connection, when an amount of change (an amount of change in an x value or an amount of change in a y value) between the first transition point and the second transition point is less than the preset amount of change, the first transition point and the second transition point may be included in one signal section. Conversely, when it is determined that an amount of change in an x value or an amount of change in a y value between the adjacent transition points is not less than the preset amount of change (530—no), operation 550 may be performed.

In operation 550, for each of the plurality of signal sections segmented in operation 540, the sensor device 110 may determine whether a distance between each transition point included in each of the plurality of signal sections and each start point of each signal section, or a distance between each transition point included in each of the plurality of signal sections and each end point of each signal section exceeds a preset distance. For example, for the first transition point included in the first signal section, the sensor device 110 may determine whether a distance between a start point of the first signal section and the first transition point or a distance between an end point of the first signal section and the first transition point exceeds the preset distance.

According to an embodiment, when the distance between each transition point and each start point of each signal section, or the distance between each transition point included in each of the plurality of signal sections and each end point of each signal section does not exceed the preset distance (550—no), the method may be terminated without executing operation 560. Conversely, when the distance between each transition point and each start point of each signal section, or the distance between each transition point included in each of the plurality of signal sections and each end point of each signal section exceeds the preset distance (550—yes), operation 560 may be executed. According to an embodiment, in operation 560, for each signal section in which the distance between each transition point included in each of the plurality of signal sections and each start point of each signal section, or the distance between each transition point included in each of the plurality of signal sections and each end point of each signal section exceeds the preset distance, the sensor device 110 may segment the signal section using the preset distance as a reference.

Figure 6:
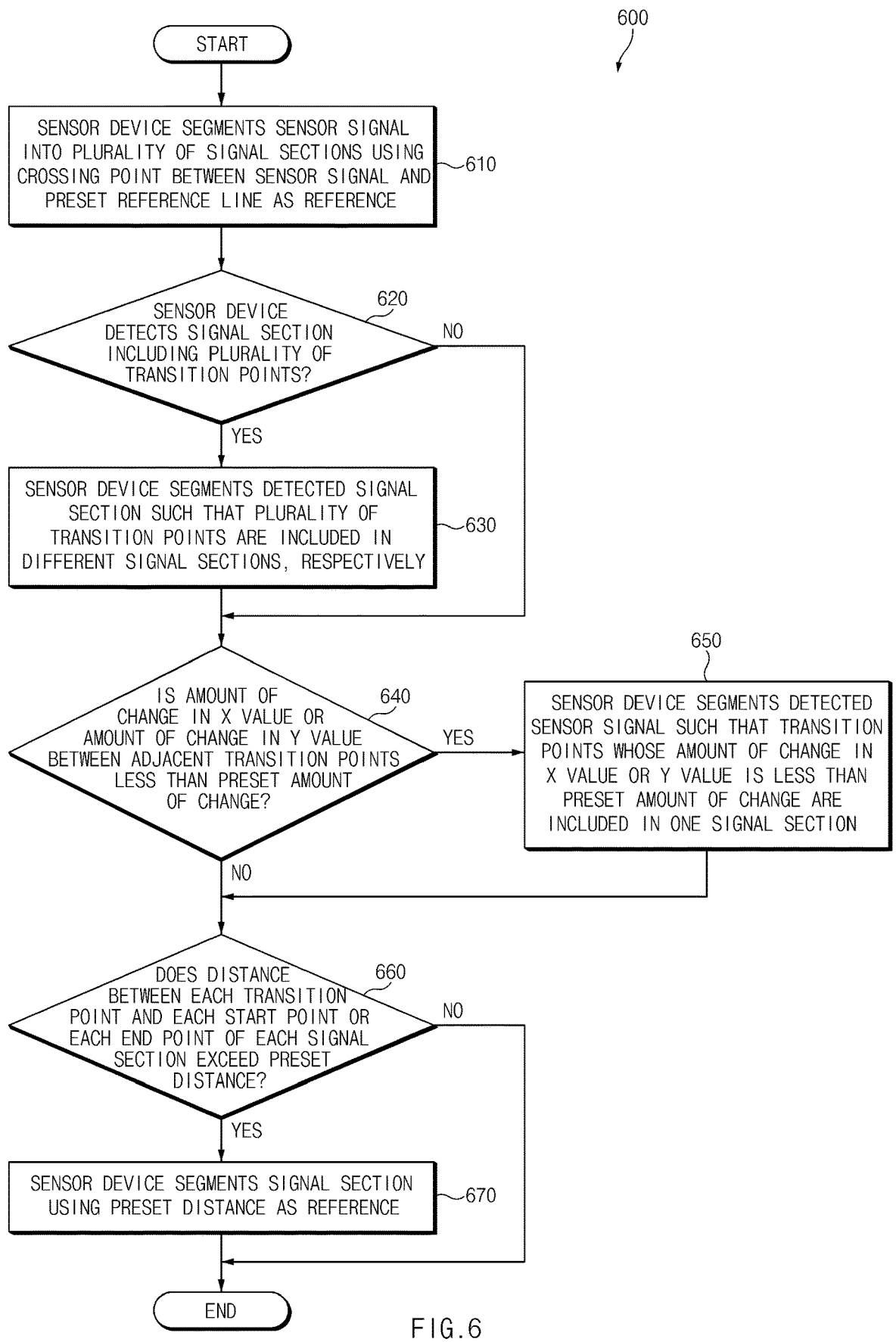
FIG. 6 is a flowchart of a method for segmenting, by an electronic device according to an embodiment, a sensor signal using a crossing point and a transition point.

FIG. 6 is a flowchart of a method for segmenting, by the electronic device 10 (e.g., the electronic device 10 in FIG. 1 or the electronic device 1401 in FIG. 14) according to an embodiment, a sensor signal using a crossing point and a transition point.

In an embodiment, the electronic device 10 may segment the sensor signal into the plurality of signal sections using the crossing point, detect the signal section including the plurality of transition points among the plurality of signal sections using the transition point, and segment the detected signal section such that the plurality of transition points are included in the different signal sections, respectively.

Referring to FIG. 6, according to an embodiment, in operation 610, the sensor device 110 may segment the sensor signal into the plurality of signal sections using the crossing point between the sensor signal and the preset reference line (e.g., a line having a y value of 0) as a reference. In an embodiment, when the number of crossing points between the sensor signal and the preset reference line is equal to or less than the preset number, the sensor device 110 may change the value of the preset reference line (e.g., operation 420 in FIG. 4).

According to an embodiment, in operation 620, for each of the plurality of signal sections generated by being segmented in operation 610, the sensor device 110 may detect the signal section including the plurality of transition points. For example, the sensor device 110 may sense the change in the slope of the sensor signal, and detect the signal section including a plurality of points at which the slope changes from the positive value to the negative value or from the negative value to the positive value.

According to an embodiment, in operation 630, for the signal section (e.g., the signal section including the plurality of transition points) detected in operation 620, the sensor device 110 may segment the signal section detected in operation 620 such that the plurality of transition points are included in the different signal sections, respectively (e.g., operation 520 in FIG. 5).

According to an embodiment, in operation 640, the sensor device 110 may determine whether the amount of change in the x value or the y value between the adjacent transition points among the plurality of transition points is less than the preset amount of change (e.g., operation 530 in FIG. 5).

According to an embodiment, when it is determined in operation 640 that the amount of change in the x value or the y value between the adjacent transition points is less than the preset amount of change (640—yes), in operation 650, the sensor device 110 may allow the two transition points whose amount of change in the x value or amount of change in the y value is less than the preset amount of change to be included in one signal section (e.g., operation 540 in FIG. 5).

In an embodiment, the plurality of transition points include the first transition point and the second transition point set at the position adjacent to the first transition point. The sensor device 110 segments the sensor signal such that the first transition point and the second transition point are included in different signal sections. When a magnitude of the first transition point (e.g., an intensity of the sensor signal at the transition point) is equal to or greater than a preset magnitude and a magnitude of the second transition point is less than the preset magnitude, the sensor device 110 may include the first transition point and the second transition point in one signal section.

According to an embodiment, in operation 660, for each of the plurality of signal sections, the sensor device 110 may determine whether the distance between each transition point included in each of the plurality of signal sections and each start point or each end point of the corresponding signal section exceeds the preset distance (e.g., operation 550 in FIG. 5).

According to an embodiment, in operation 670, for the signal section in which the distance between each transition point included in each of the plurality of signal sections and each start point or each end point of the corresponding signal section exceeds the preset distance, the sensor device 110 may segment the signal section using the preset distance as a reference (e.g., operation 560 in FIG. 5). For example, when the distance between the first transition point included in the first signal section and the start point of the first signal section exceeds the preset distance (660—yes), the sensor device 110 may segment the first signal section using a point separated by the preset distance in a direction of the first transition point from the start point of the first signal section as a reference. In an embodiment, when both the distance between the first transition point included in the first signal section and the start point of the first signal section and the distance between the first transition point included in the first signal section and the end point of the first signal section exceed the preset distance, the sensor device 110 may segment the first signal section such that the first transition point is included in a signal section having a width of a preset distance around the first transition point.

Conversely, when the distance between the first transition point included in the first signal section and the start point of the first signal section does not exceed the preset distance (660—no), the sensor device 110 may terminate the method for segmenting the sensor signal without segmenting the signal section using the preset distance as a reference.

Figure 7:
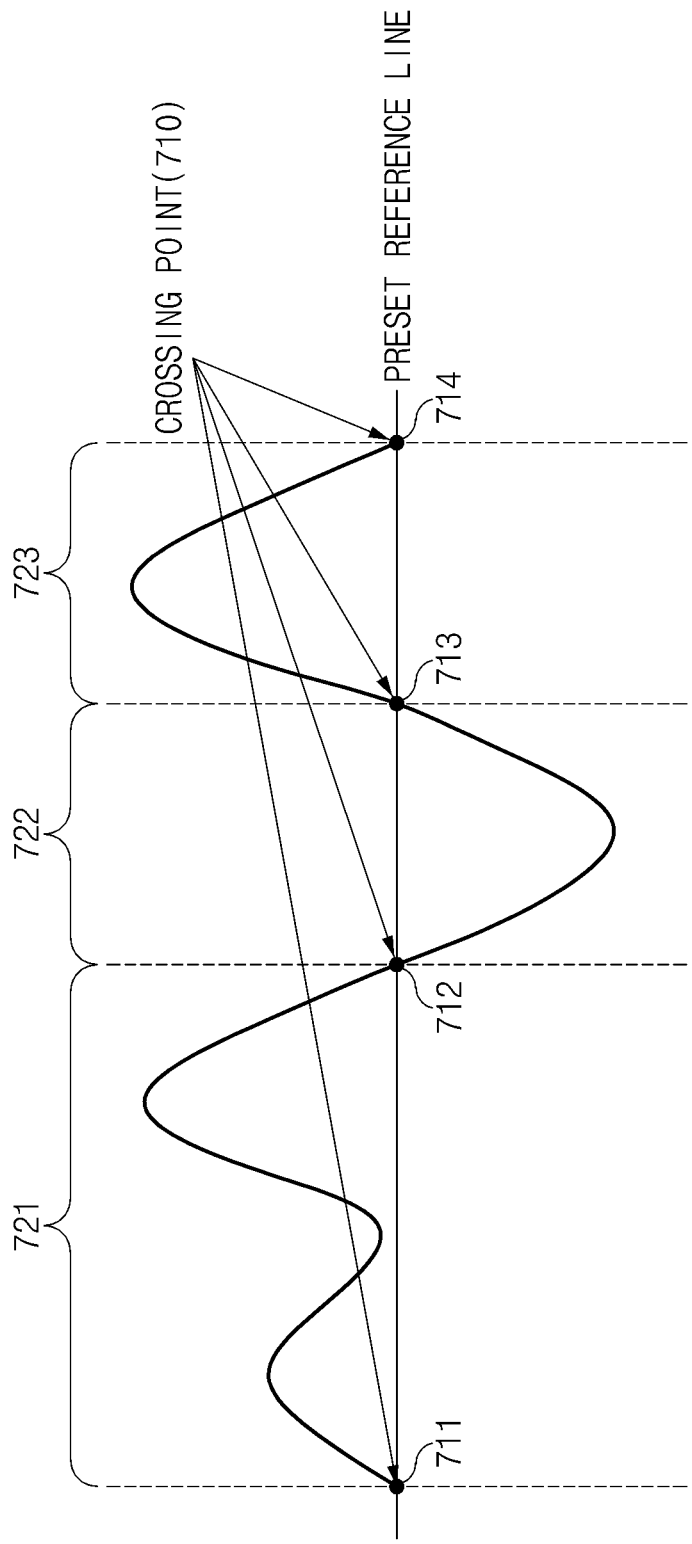
FIG. 7 is a diagram illustrating a form in which a sensor signal is segmented using a crossing point in an embodiment.
Figure 8:
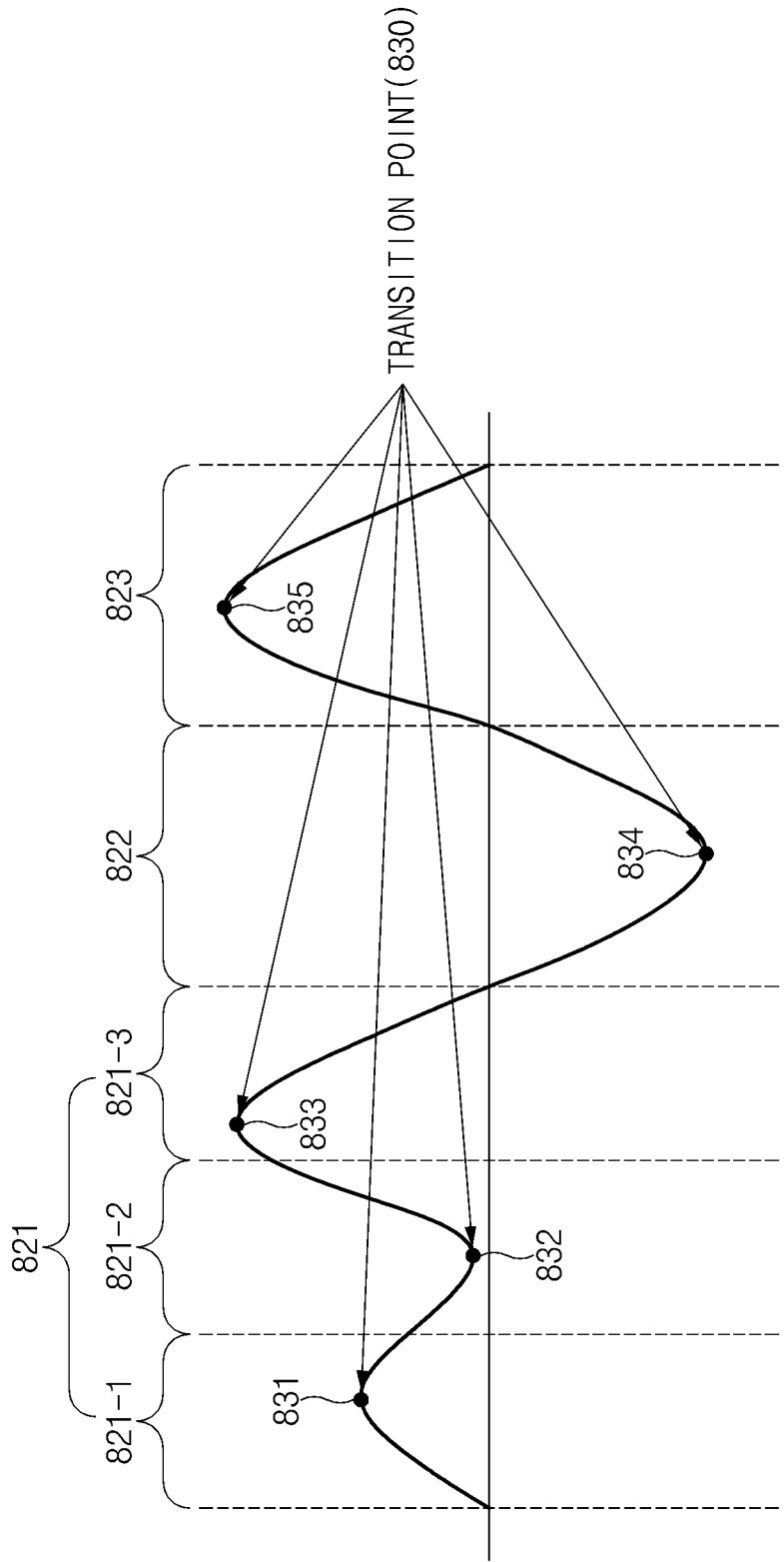
FIG. 8 is a diagram illustrating a form in which a sensor signal is segmented using a crossing point and a transition point in an embodiment.

FIG. 7 is a diagram illustrating a form in which a sensor signal is segmented using a crossing point in an embodiment, and FIG. 8 is a diagram illustrating a form in which a sensor signal is segmented using a crossing point and a transition point in an embodiment.

In FIG. 7, the signal is divided into sections 721, 722, and 723, at each crossing point 711 . . . 714. However section 721 has three transition points.

First, referring to FIG. 7, according to certain embodiments, the electronic device 10 (e.g., the electronic device 10 in FIG. 1 or the electronic device 1401 in FIG. 14) may set a crossing point 710 (e.g., a first crossing point 711, a second crossing point 712, a third crossing point 713, and a fourth crossing point 714) using the sensor signal and the preset reference line. The electronic device 10 may segment the sensor signal into the plurality of signal sections using the first crossing point 711, the second crossing point 712, the third crossing point 713, and the fourth crossing point 714. For example, the electronic device 10 may primarily segment the sensor signal into a first signal section 721 between the first crossing point 711 and the second crossing point 712, a second signal section 722 between the second crossing point 712 and the third crossing point 713, and a third signal section 723 between the third crossing point 713 and the fourth crossing point 714.

Referring to FIG. 8, section 721/821 which has three transition points 831, 832, and 833 is further signal sections 821-1, 821-2, and 821-3.

The electronic device 10 may set the transition point from the sensor signal, and detect a signal section including a plurality of transition points from the primarily segmented sensor signal (e.g., the primarily segmented sensor signal in FIG. 7) using the transition point. For example, the electronic device 10 may sense the change in the slope of the sensor signal (e.g., a degree to which the value of the sensor signal changes during a unit time), and may detect a first signal section 821 including points (e.g., a first transition point 831, a second transition point 832, and a third transition point 833) at which the slope of the sensor signal changes from the positive value to the negative value or from the negative value to the positive value among the first signal section 821, the second signal section 822, and the third signal section 823. For example, the point at which the slope of the sensor signal changes from the positive value to the negative value may be a point at which a value of a gradually rising signal starts to fall again after reaching a maximum value. In an embodiment, the electronic device 10 may secondarily segment the first signal section 821 such that the first transition point 831, the second transition point 832, and the third transition point 833 included in the first signal section 821 are respectively included in different signal sections (e.g., segment the first signal section 821 into a first section 821-1 of the first signal section, a second section 821-2 of the first signal section, and a third section 821-3 of the first signal section).

Figure 9:
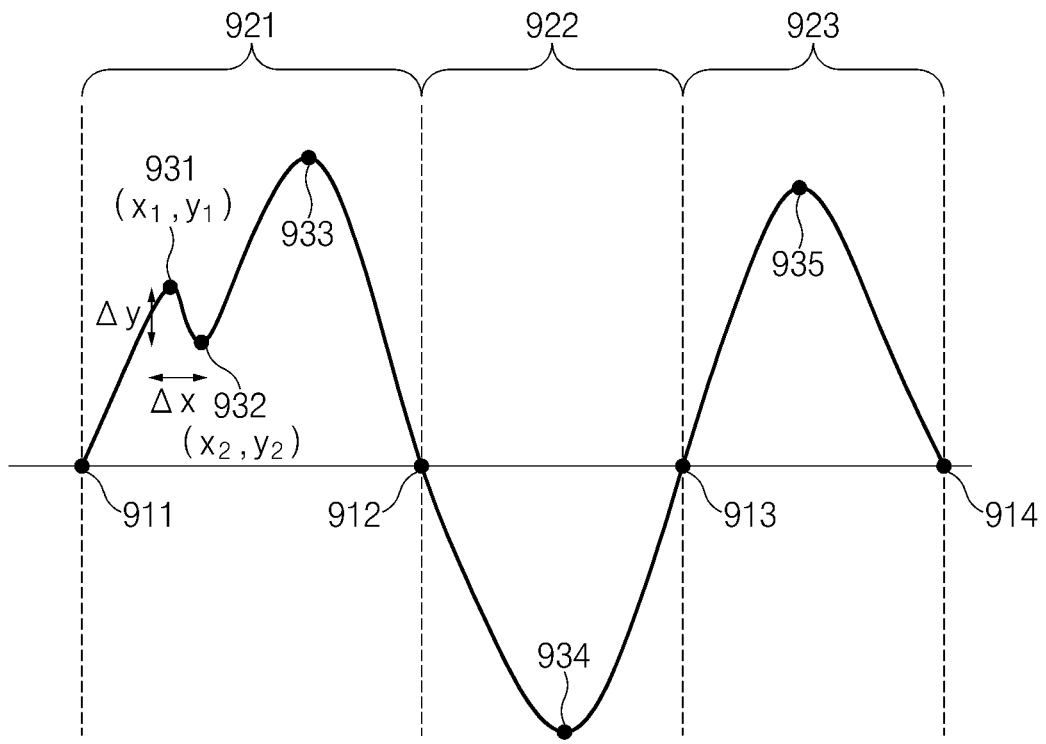
FIG. 9 is a diagram illustrating a form of segmentation of a sensor signal based on an amount of change in an x value or a y value between adjacent transition points in an embodiment.

FIG. 9 is a diagram illustrating a form of segmentation of a sensor signal based on an amount of change in an x value or a y value between adjacent transition points in an embodiment.

In an embodiment, when the plurality of transition points are included in one signal section, the electronic device 10 (e.g., the electronic device 10 in FIG. 1 or the electronic device 1401 in FIG. 14) may segment the signal section such that the plurality of transition points are respectively included in the different signal sections, and may determine whether to segment the signal section based on the amount of change in the x value or the amount of change in the y value between the adjacent transition points among the plurality of transition points.

Referring to FIG. 9, the electronic device 10 may set the crossing point (e.g., a first crossing point 911, a second crossing point 912, a third crossing point 913, and a fourth crossing point 914) and the transition point (e.g., a first transition point 931, a second transition point 932, a third transition point 933, a fourth transition point 934, and a fifth transition point 935) from the sensor signal. The electronic device 10 may segment the sensor signal into a first signal section 921, a second signal section 922, and a third signal section 923 using the first crossing point 911, the second crossing point 912, the third crossing point 913, and the fourth crossing point 914. The electronic device 10 may detect a signal section including a plurality of transition points among the first signal section 921, the second signal section 922, and the third signal section 923 using the first transition point 931, the second transition point 932, the third transition point 933, the fourth transition point 934, and the fifth transition point 935.

The electronic device 10 may segment the signal section including the plurality of transition points such that the transition points are included in different signal sections, respectively. The electronic device 10 may segment the first signal section 921 such that the first transition point 931, the second transition point 932, and the third transition point 933 are included in different signal sections, and may determine whether to segment the first signal section 921 based on an amount of change in an x value or a y value between the first transition point 931 and the second transition point 932, and an amount of change in an x value or a y value between the second transition point 932 and the third transition point 933. For example, when the amount of change in the y value ($\Delta y$) between the first transition point 931 and the second transition point 932 is less than the preset amount of change, the electronic device 10 may include the first transition point 931 and the second transition point 932 in one signal section. When the amount of change in the y value ($\Delta y$) between the second transition point 932 and the third transition point 933 is equal to or greater than the preset amount of change, the electronic device 10 may segment the first signal section 921 such that the second transition point 932 and the third transition point 933 are included in different signal sections.

Figure 10:
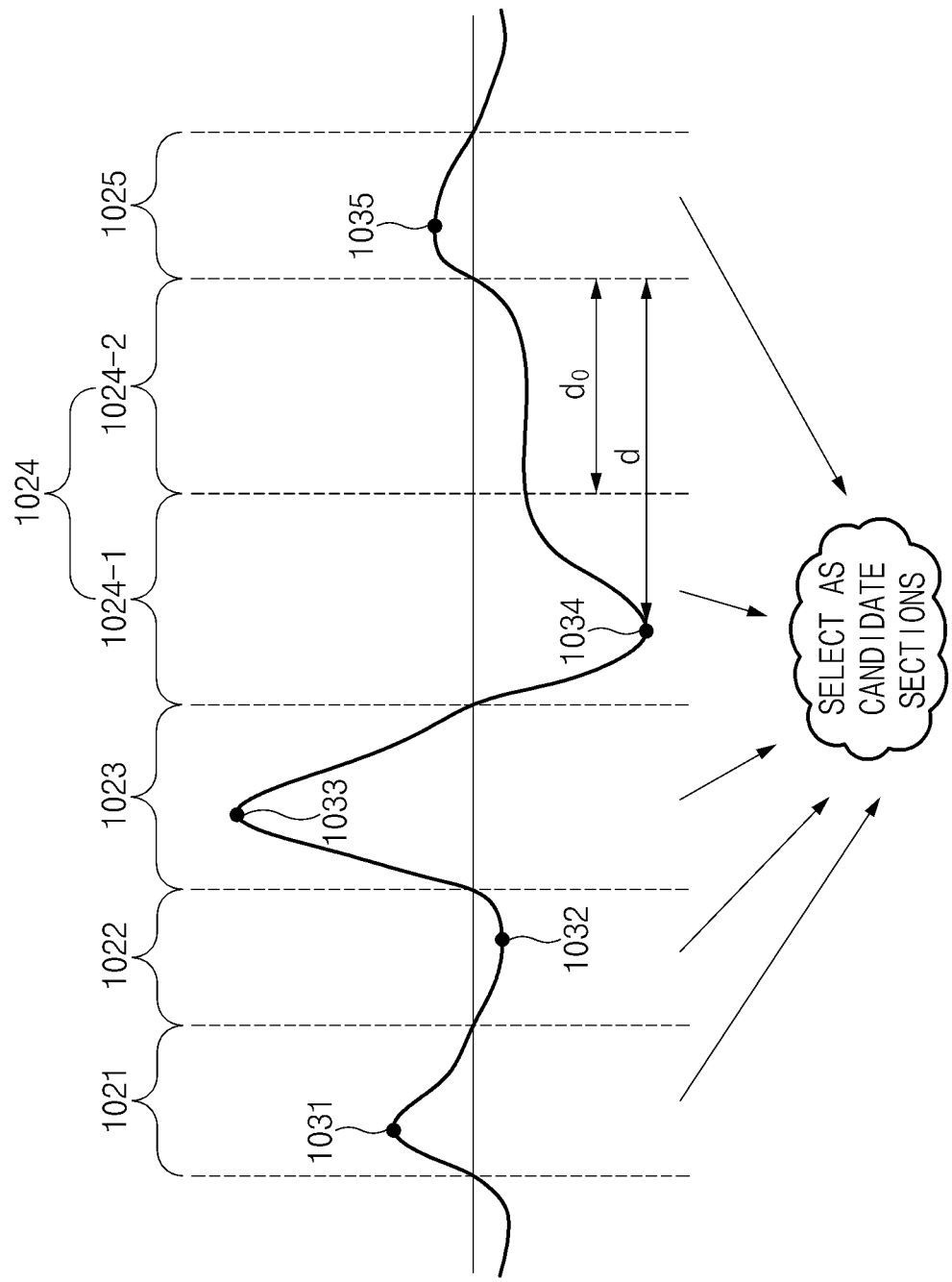
FIG. 10 is a diagram illustrating a form of segmenting a sensor signal based on a distance between a transition point and a start point or an end point of a signal section, and selecting a candidate section among the segmented sensor signals in an embodiment.

FIG. 10 is a diagram illustrating a form of segmenting a sensor signal based on a distance between a transition point and a start point or an end point of a signal section, and selecting a candidate section among the segmented sensor signals in an embodiment.

Referring to FIG. 10, the electronic device 10 (e.g., the electronic device 10 in FIG. 1 or the electronic device 1401 in FIG. 14) according to an embodiment may segment the sensor signal into a first signal section 1021, a second signal section 1022, a third signal section 1023, a fourth signal section 1024, and a fifth signal section 1025 using the crossing point between the sensor signal and the preset reference line as a reference. The electronic device 10 may segment the sensor signal such that each of the first signal section 1021, the second signal section 1022, the third signal section 1023, the fourth signal section 1024, and the fifth signal section 1025 includes one transition point using a first transition point 1031, a second transition point 1032, a third transition point 1033, a fourth transition point 1034, and a fifth transition point 1035 using the slope of the sensor signal.

In an embodiment, the electronic device 10 may determine whether each of the first signal section 1021, the second signal section 1022, the third signal section 1023, the fourth signal section 1024, and the fifth signal section 1025 exceeds a distance between a start point or an end point of each signal section and a transition point included in each signal section and a preset distance $d_0$ to detect a signal section exceeding the preset distance $d_0$. The electronic device 10 may segment the signal section exceeding the preset distance $d_0$ based on the preset distance $d_0$. For example, when a distance d between the fourth transition point 1034 included in the fourth signal section 1024 and an end point of the fourth signal section 1024 exceeds the preset distance $d_0$, the electronic device 10 may segment the fourth signal section 1024 by the preset distance $d_0$ from the end point of the fourth signal section 1024 (e.g., a first section 1024-1 of the fourth signal section and a second section 1024-2 of the fourth signal section).

In an embodiment, the electronic device 10 may determine whether at least one transition point is included in each of the plurality of signal sections, and set signal sections, each of which including at least one transition point among the plurality of signal sections as a plurality of candidate sections for recognizing the gesture of the user. For example, the electronic device 10 may set, among the plurality of signal sections, the first signal section 1021 including the first transition point 1031, the second signal section 1022 including the second transition point 1032, the third signal section 1023 including the third transition point 1033, the first section 1024-1 of the fourth signal section 1024 including the fourth transition point 1034, and the fifth signal section 1025 including the fifth transition point 1035 as the candidate sections.

Figure 11:
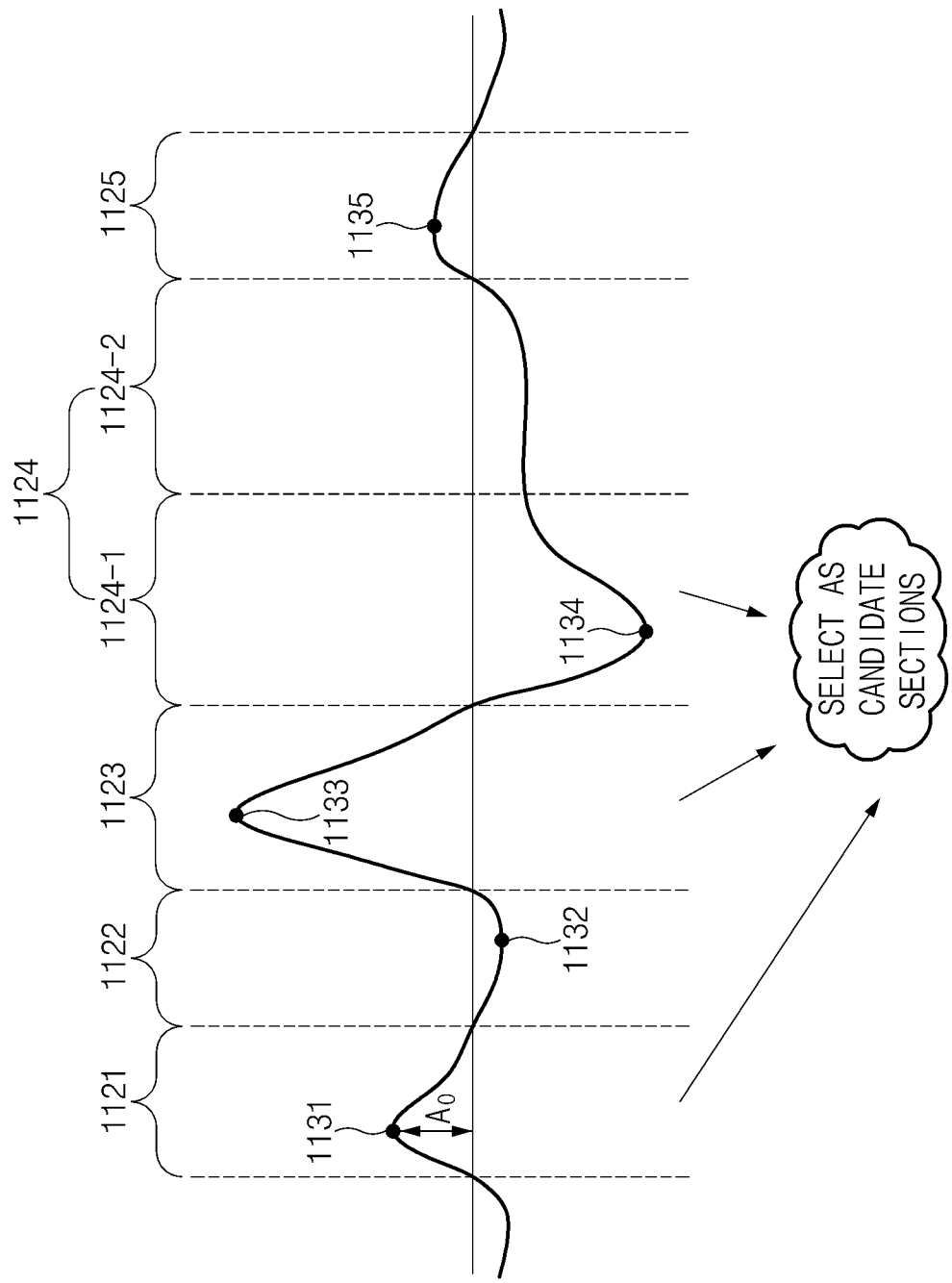
FIG. 11 is a diagram illustrating a form of selecting candidate sections based on an intensity of a sensor signal in an embodiment.

FIG. 11 is a diagram illustrating a form of selecting candidate sections based on an intensity of a sensor signal in an embodiment.

Referring to FIG. 11, the electronic device 10 (e.g., the electronic device 10 in FIG. 1 or the electronic device 1401 in FIG. 14) according to an embodiment may set the candidate sections for the gesture recognition among the plurality of signal sections using an intensity (an amplitude) of a transition point included in each of the plurality of signal sections. For example, the electronic device 10 may calculate an intensity A of the transition point included in each of the plurality of signal sections, detect signal sections (e.g., a first signal section 1121, a third signal section 1123, and a fourth signal section 1124) in which the calculated intensity of each transition point is equal to or above a preset intensity $A_0$, and set the detected signal sections as the plurality of candidate sections for recognizing the gesture of the user. In an embodiment, the electronic device 10 may set signal sections in which an integral value of a plurality of sensor signals is less than a preset integral value among the plurality of signal sections as the plurality of candidate sections for recognizing the gesture of the user.

In an embodiment, the electronic device 10 may set a weighted value of the gesture recognition for each of the plurality of candidate sections, and may apply each weighted value to each of the plurality of candidate sections such that each weighted value is inversely proportional to the intensity of the sensor signal included in each of the plurality of candidate sections. For example, the electronic device 10 may set the weighted values for the first signal section 1121, the third signal section 1123, and the fourth signal section 1124 set as the candidate sections such that the first signal section 1121 has the highest weighted value, the fourth signal section 1124 has the second highest weighted value, and the third signal section 1123 has the lowest weighted value. In an embodiment, the electronic device 10 may recognize the gesture of the user using only a feature value extracted from a candidate section whose weighted value is equal to or greater than a reference among feature values respectively extracted from the plurality of candidate sections.

Figure 12A:
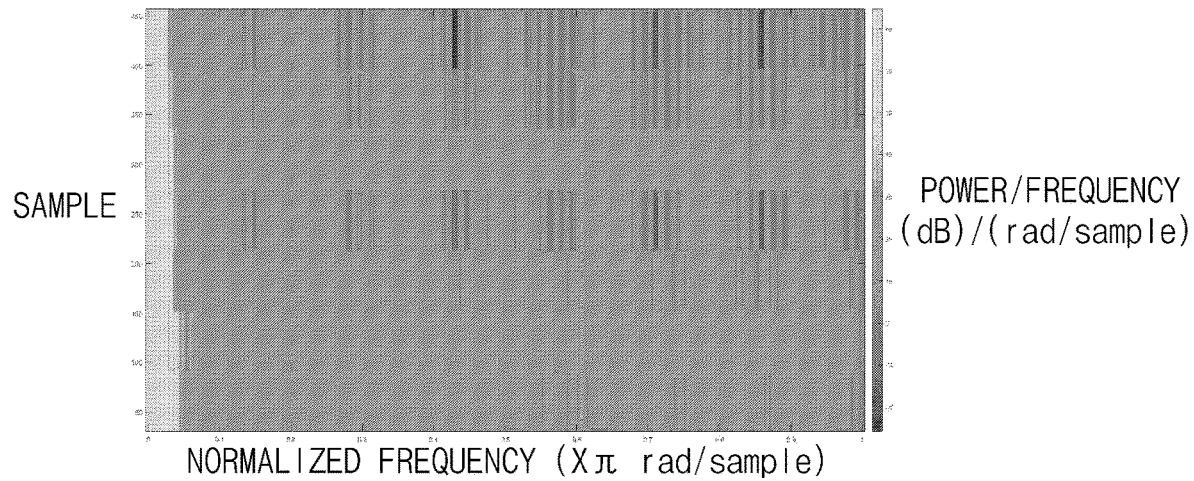
FIG. 12A and FIG. 12B is a diagram illustrating a heartbeat signal of a user through a frequency density function in an embodiment.
Figure 12B:
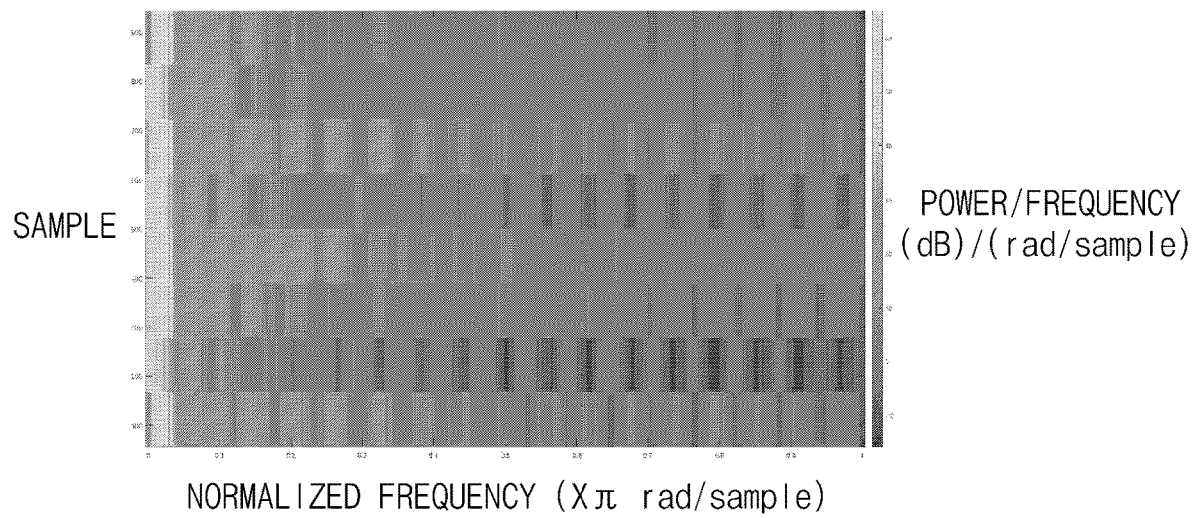

FIG. 12A and FIG. 12B are a diagram illustrating a heartbeat signal of a user through a frequency density function in an embodiment.

Referring to FIG. 12A and FIG. 12B, when the electronic device 10 including the PPG sensor (e.g., the electronic device 10 in FIG. 1 or the electronic device 1401 in FIG. 14) is intended to extract a feature value indicating the gesture of the user from a heartbeat signal sensed from the user, the electronic device 10 extracts a gesture signal from the heartbeat signal and analyzes the extracted gesture signal to extract the feature value. However, in a case in which the heartbeat signal and the gesture signal are sensed together as shown in FIG. 12B compared to a case in which only the heartbeat signal is sensed as shown in FIG. 12A, because the gesture signal and the heartbeat are sensed in a state of being mixed with each other (because frequency domains of the gesture signal and the heartbeat signal overlap each other in terms of a frequency), even though the sensor signal is filtered through the pre-processing operation (e.g., a noise signal is removed from the sensor signal using the bandpass filter), there is a problem that it is difficult to distinguish the gesture signal in terms of the frequency. In addition, when the electronic device 10 is the wearable device, a state (e.g., an age, a gender, a race, a skin color, a health status, and the like) of the user wearing the wearable device, a wearing state (e.g., a wearing intensity, a wearing position, and the like) may affect the sensed sensor signal, and the waveform, a magnitude, and the like of the sensor signal may vary by an external environmental factor. That is, because the sensor signal sensed from the sensor device 110 is affected not only by the state of the user and the wearing state, but also by the external factor, even when different users perform the same gesture, sensor signals of different waveforms and magnitudes are sensed, which adversely affects the extraction of a common feature.

To solve the above problem, when the sensor signal includes a signal having a predetermined pattern (e.g., a bio-signal including a PPG signal and a noise signal of a certain pattern) and the gesture signal, the electronic device 10 (e.g., the electronic device 10 in FIG. 1 or the electronic device 1401 in FIG. 14) according to an embodiment may extract the feature value for the gesture using information of a signal section including the gesture signal (e.g., the maximum value, an average value, an energy value, the correlation, the entropy, the Fast Fourier Transform coefficient, the mean, the variance, the covariance, the time series data length, the skewness, kurtosis, and integral values of the sensor signal) and information of a signal section that does not include the gesture signal. For example, the electronic device 10 may extract the feature value using also a signal before the gesture occurs. Information of a waveform before the gesture sensed from the sensor device 110 occurs may include information reflecting the state of the user and the external environmental factors. The electronic device 10 may compensate for the sensor values that are different based on the environmental factor despite of being resulted from the same gesture and effectively extract the feature value by mixing the information of the waveform before the gesture occurs and information of a waveform of the gesture section with each other and using the mixed information as one feature. An embodiment of this will be described in detail with reference to FIG. 13.

Figure 13A:
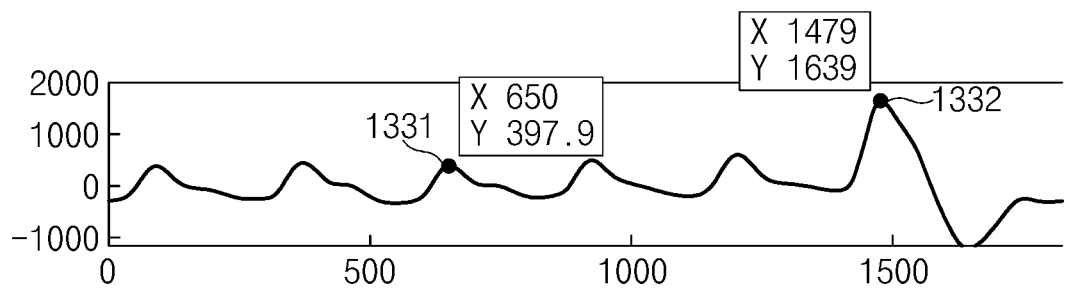
FIG. 13A and FIG. 13B illustrate sensor signals sensed when different users perform the same gesture.
Figure 13B:
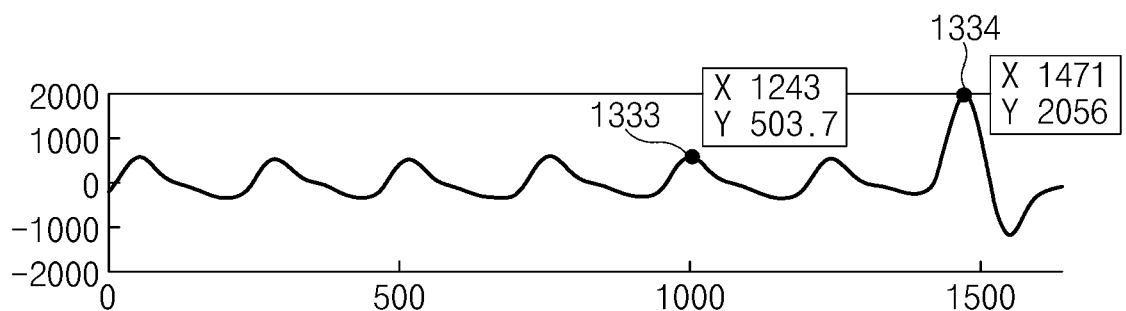

FIG. 13A and FIG. 13B illustrates a PPG signal (FIG. 13A) sensed from a user A and a PPG signal (FIG. 13B) sensed from a user B when different users (e.g., the user A and the user B) perform the same gesture.

Referring to FIGS. 13A and 13B, even when the different users perform the same gesture, the different waveforms may be sensed based on the state of the user, the wearing state, and the external factor. While the PPG signal (FIG. 13A) sensed from the user A has a maximum value (a peak) 1331 of a heartbeat waveform of 397.9 in the signal section that does not include the gesture signal, and a maximum value (a peak) 1332 of 1639 in the signal section that includes the gesture signal, the PPG signal (FIG. 13B) sensed from the user B has a maximum value (a peak) 1333 of a heartbeat waveform of 503.7 in the signal section that does not include the gesture signal, and a maximum value (a peak) 1334 of 2056 in the signal section that includes the gesture signal.

In a case of a conventional gesture recognition method (e.g., a method of using the maximum value of the gesture signal as the feature value), even when the user A and the user B perform the same gesture operation, because the maximum values of the sensor signals respectively sensed by the users are sensed differently, it is difficult for the user A and the user B to extract the common feature. A description will be achieved using Table 3 as an example.

TABLE 3

|  | Maximum value | First method | Second method |
| --- | --- | --- | --- |
| Person A | 1639 | 4.44 | 1639/397 = 4.12 |
| Person B | 2056 | 3.79 | 2056/503 = 4.08 |

Referring to Table 3, when using a normalization technique, which is a first method, on different values to solve this, feature values extracted from the user A and the user B are compensated to some extent to have values within a certain range (e.g., the feature value of the user A is calculated to be 4.44, and the feature value of the user B is calculated to be 3.79). However, because a range of the calculated feature value is somewhat large, it is difficult to accurately recognize the gesture.

When using a second method of Table 3 according to an embodiment to overcome the problem in the conventional gesture recognition method, the electronic device 10 may extract a ratio between a maximum value of a sensor signal intensity in the signal section including the gesture signal and a maximum value of a sensor signal intensity in a general signal section (e.g., the signal section that does not include the gesture signal) as the feature value for the gesture. For example, the electronic device 10 may extract, from the sensor signal sensed from the user A, 4.12, which is a ratio of 1639, which is the maximum value 1332 of the signal intensity of the signal section including the gesture signal, and 397.9, which is the maximum value 1331 of the signal intensity of the signal section that does not include the gesture signal as the feature value. The electronic device 10 may extract, from the sensor signal sensed from the user B, 4.08, which is a ratio of 2056, which is the maximum value 1334 of the signal intensity of the signal section including the gesture signal, and 503.7, which is the maximum value 1333 of the signal intensity of the signal section that does not include the gesture signal as the feature value. In an embodiment, the electronic device 10 may perform an operation (e.g., various statistical operations including four arithmetic operations, comparison operations, logical operations, spectrum analysis, correlation coefficient, variance, standard deviation operations, and the like) between information of the signal section including the gesture signal and information of the signal section that does not include the gesture signal, and extract the result of the operation as the feature value for the gesture.

FIG. 14 is a block diagram of an electronic device 1401 in a network environment 1400 according to certain embodiments. Referring to FIG. 14, the electronic device 1401 may communicate with an electronic device 1402 through a first network 1498 (e.g., a short-range wireless communication network) or may communicate with an electronic device 1404 or a server 1408 through a second network 1499 (e.g., a long-distance wireless communication network) in the network environment 1400. According to an embodiment, the electronic device 1401 may communicate with the electronic device 1404 through the server 1408. According to an embodiment, the electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module 1496, or an antenna module 1497. According to some embodiments, at least one (e.g., the display device 1460 or the camera module 1480) among components of the electronic device 1401 may be omitted or one or more other components may be added to the electronic device 1401. According to some embodiments, some of the above components may be implemented with one integrated circuit. For example, the sensor module 1476 (e.g., a fingerprint sensor, an iris sensor, or an illuminance sensor) may be embedded in the display device 1460 (e.g., a display).

The processor 1420 may execute, for example, software (e.g., a program 1440) to control at least one of other components (e.g., a hardware or software component) of the electronic device 1401 connected to the processor 1420 and may process or compute a variety of data. According to an embodiment, as a part of data processing or operation, the processor 1420 may load a command set or data, which is received from other components (e.g., the sensor module 1476 or the communication module 1490), into a volatile memory 1432, may process the command or data loaded into the volatile memory 1432, and may store result data into a nonvolatile memory 1434. According to an embodiment, the processor 1420 may include a main processor 1421 (e.g., a central processing unit or an application processor) and an auxiliary processor 1423 (e.g., a graphic processing device, an image signal processor, a sensor hub processor, or a communication processor), which operates independently from the main processor 1421 or with the main processor 1421. Additionally or alternatively, the auxiliary processor 1423 may use less power than the main processor 1421, or is specified to a designated function. The auxiliary processor 1423 may be implemented separately from the main processor 1421 or as a part thereof.

The auxiliary processor 1423 may control, for example, at least some of functions or states associated with at least one component (e.g., the display device 1460, the sensor module 1476, or the communication module 1490) among the components of the electronic device 1401 instead of the main processor 1421 while the main processor 1421 is in an inactive (e.g., sleep) state or together with the main processor 1421 while the main processor 1421 is in an active (e.g., an application execution) state. According to an embodiment, the auxiliary processor 1423 (e.g., the image signal processor or the communication processor) may be implemented as a part of another component (e.g., the camera module 1480 or the communication module 1490) that is functionally related to the auxiliary processor 1423.

The memory 1430 may store a variety of data used by at least one component (e.g., the processor 1420 or the sensor module 1476) of the electronic device 1401. For example, data may include software (e.g., the program 1440) and input data or output data with respect to commands associated with the software. The memory 1430 may include the volatile memory 1432 or the nonvolatile memory 1434.

The program 1440 may be stored in the memory 1430 as software and may include, for example, an operating system 1442, a middleware 1444, or an application 1446.

The input device 1450 may receive a command or data, which is used for a component (e.g., the processor 1420) of the electronic device 1401, from an outside (e.g., a user) of the electronic device 1401. The input device 1450 may include, for example, a microphone, a mouse, a keyboard, or a digital pen (e.g., a stylus pen).

The sound output device 1455 may output a sound signal to the outside of the electronic device 1401. The sound output device 1455 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 1460 may visually provide information to the outside (e.g., the user) of the electronic device 1401. For example, the display device 1460 may include a display, a hologram device, or a projector and a control circuit for controlling a corresponding device. According to an embodiment, the display device 1460 may include a touch circuitry configured to sense the touch or a sensor circuit (e.g., a pressure sensor) for measuring an intensity of pressure on the touch.

The audio module 1470 may convert a sound and an electrical signal in dual directions. According to an embodiment, the audio module 1470 may obtain the sound through the input device 1450 or may output the sound through the sound output device 1455 or an external electronic device (e.g., the electronic device 1402 (e.g., a speaker or a headphone)) directly or wirelessly connected to the electronic device 1401.

The sensor module 1476 may generate an electrical signal or a data value corresponding to an operating state (e.g., power or temperature) inside or an environmental state (e.g., a user state) outside the electronic device 1401. According to an embodiment, the sensor module 1476 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1477 may support one or more designated protocols to allow the electronic device 1401 to connect directly or wirelessly to the external electronic device (e.g., the electronic device 1402). According to an embodiment, the interface 1477 may include, for example, an HDMI (high-definition multimedia interface), a USB (universal serial bus) interface, an SD card interface, or an audio interface.

A connecting terminal 1478 may include a connector that physically connects the electronic device 1401 to the external electronic device (e.g., the electronic device 1402). According to an embodiment, the connecting terminal 1478 may include, for example, an HDMI connector, a USB connector, an SD card connector, or an audio connector (e.g., a headphone connector).

The haptic module 1479 may convert an electrical signal to a mechanical stimulation (e.g., vibration or movement) or an electrical stimulation perceived by the user through tactile or kinesthetic sensations. According to an embodiment, the haptic module 1479 may include, for example, a motor, a piezoelectric element, or an electric stimulator.

The camera module 1480 may shoot a still image or a video image. According to an embodiment, the camera module 1480 may include, for example, at least one or more lenses, image sensors, image signal processors, or flashes.

The power management module 1488 may manage power supplied to the electronic device 1401. According to an embodiment, the power management module 1488 may be implemented as at least a part of a power management integrated circuit (PMIC).

The battery 1489 may supply power to at least one component of the electronic device 1401. According to an embodiment, the battery 1489 may include, for example, a non-rechargeable (primary) battery, a rechargeable (secondary) battery, or a fuel cell.

The communication module 1490 may establish a direct (e.g., wired) or wireless communication channel between the electronic device 1401 and the external electronic device (e.g., the electronic device 1402, the electronic device 1404, or the server 1408) and support communication execution through the established communication channel. The communication module 1490 may include at least one communication processor operating independently from the processor 1420 (e.g., the application processor) and supporting the direct (e.g., wired) communication or the wireless communication. According to an embodiment, the communication module 1490 may include a wireless communication module 1492 (e.g., a cellular communication module, a short-range wireless communication module, or a GNSS (global navigation satellite system) communication module) or a wired communication module 1494 (e.g., an LAN (local area network) communication module or a power line communication module). The corresponding communication module among the above communication modules may communicate with the external electronic device 1404 through the first network 1498 (e.g., the short-range communication network such as a Bluetooth, a WiFi direct, or an IrDA (infrared data association)) or the second network 1499 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 1492 may identify and authenticate the electronic device 1401 using user information (e.g., international mobile subscriber identity (IMSI)) stored in the subscriber identification module 1496 in the communication network, such as the first network 1498 or the second network 1499.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., PCB). According to an embodiment, the antenna module 1497 may include a plurality of antennas. In such a case, at least one antenna appropriate for a communication scheme used in the communication network, such as the first network 1498 or the second network 1499, may be selected, for example, by the communication module 1490 from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1401 and the external electronic device 1404 through the server 1408 connected to the second network 1499. Each of the external electronic devices 1402 and 1404 may be the same or different types as or from the electronic device 1401. According to an embodiment, all or some of the operations performed by the electronic device 1401 may be performed by one or more external electronic devices among the external electronic devices 1402, 1404, or 1408. For example, when the electronic device 1401 performs some functions or services automatically or by request from a user or another device, the electronic device 1401 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1401. The electronic device 1401 may provide the result as is or after additional processing as at least a part of the response to the request. To this end, for example, a cloud computing, distributed computing, or client-server computing technology may be used.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that certain embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Certain embodiments of the disclosure may be implemented by software (e.g., the program 1440) including an instruction stored in a machine-readable storage medium (e.g., an internal memory 1436 or an external memory 1438) readable by a machine (e.g., the electronic device 1401). For example, the processor (e.g., the processor 1420) of a machine (e.g., the electronic device 1401) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one or plural entities. According to certain embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to certain embodiments, operations performed by a module, a programming, or other components may be executed sequentially, in parallel, repeatedly, or in a heuristic method, or at least some operations may be executed in different sequences, omitted, or other operations may be added.

Certain embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 1430).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to certain embodiments may be, for example, implemented by instructions stored in a computer-readable storage media (e.g., the memory 1430) in the form of a program module. The instruction, when executed by a processor (e.g., the processor 1420), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to certain embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to certain embodiments, operations executed by modules, program modules, or other components may be executed by a successive method, a parallel method, a repeated method, or a heuristic method, or at least one part of operations may be executed in different sequences or omitted. Alternatively, other operations may be added.

According to certain embodiments disclosed in the disclosure, as the sensor signal sensed from the user is elaborately subdivided and the subdivided signal sections are respectively analyzed to recognize the gesture, a result value of high reliability may be derived with a small amount of operations for the gesture recognition.

According to certain embodiments disclosed in the disclosure, as a normal signal generally sensed from the user and the gesture signal sensed during the gesture operation are compared to each other to extract the feature value for the gesture, the gesture may be accurately recognized from the different signals sensed by the different users.

In addition, various effects that are directly or indirectly identified through the disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:
1. An electronic device comprising:
 a sensor device including at least one biometric sensor;
 memory storing a table of a plurality of gestures, wherein for each gesture, a corresponding plurality of features are stored in the memory; and
 at least one processor operatively connected to the sensor device and the memory, wherein the at least one processor is configured to:
obtain a bio-signal of a user from the at least one biometric sensor;
identify a crossing point between the bio-signal and a specified reference line and a transition point of the bio-signal;
segment the bio-signal into a plurality of signal sections based on at least one of the crossing point and the transition point;
extract a feature value from each of the plurality of signal sections;
determine a specific one of the plurality of gestures based on the extracted feature value and the corresponding plurality features for the plurality of gestures; and
when a number of plurality of signal sections is less than a preset number, change a value of the reference line such that the number of plurality of signal sections is equal to or greater than the preset number.

2. The electronic device of claim 1, wherein the specified reference line is a line connecting points where a raw value becomes 0 with each other when a value of the bio-signal is the raw value.

3. The electronic device of claim 1, wherein the specified reference line is a line connecting points where a value of the bio-signal normalized by the processor becomes 0 with each other when the value of the bio-signal is not a raw value.

4. The electronic device of claim 1, wherein the processor is configured to:
segment the bio-signal into a plurality of signal sections using the crossing point;
detect a signal section including a plurality of transition points among the plurality of signal sections; and
segment the detected signal section such that the plurality of transition points are respectively included in different signal sections.

5. The electronic device of claim 4, wherein the plurality of transition points include a first transition point and a second transition point set at a position adjacent to the first transition point,
wherein the processor is configured to segment the detected signal section such that the first transition point and the second transition point are included in one signal section when at least one of an amount of change in an x value and an amount of change in a y value between the first transition point and the second transition point is less than a preset amount of change.

6. The electronic device of claim 4, wherein the plurality of transition points include a first transition point and a second transition point set at a position adjacent to the first transition point,
wherein the processor is configured to segment the detected signal section such that the first transition point and the second transition point are included in one signal section when a magnitude of the first transition point is equal to or greater than a preset magnitude, and a magnitude of the second transition point is less than the preset magnitude.

7. The electronic device of claim 4, wherein the processor is configured to segment a first signal section using a preset distance as a reference when, in the first signal section including a first transition point among the plurality of signal sections, a distance between the first transition point and a start point of the first signal section or between the first transition point and an end point of the first signal section exceeds the preset distance.

8. The electronic device of claim 4, wherein the processor is configured to:
determine whether at least one transition point is included in each of the plurality of signal sections; and
set signal sections including the at least one transition point among the plurality of signal sections as a plurality of candidate sections for recognizing the gesture of the user.

9. The electronic device of claim 8, wherein the processor is configured to apply each weighted value of gesture recognition to each of the plurality of candidate sections, wherein each weighted value is inversely proportional to an intensity of the bio-signal for each candidate section.

10. The electronic device of claim 4, wherein the processor is configured to set signal sections where an intensity of the bio-signal is equal to or greater than a preset intensity among the plurality of signal sections as a plurality of candidate sections.

11. The electronic device of claim 4, wherein the processor is configured to set signal sections where an integral value of the bio-signal is less than a preset integral value among the plurality of signal sections as a plurality of candidate sections.

12. The electronic device of claim 4, wherein the processor is configured to:
segment the bio-signal into the plurality of signal sections using the crossing point; and
set a preset reference line such that at least one transition point is included in each of the plurality of signal sections.

13. The electronic device of claim 1, wherein the sensor device includes at least one of an acceleration sensor, a photoplethysmography (PPG) sensor, a gyro sensor, a geomagnetic sensor, and an electrocardiogram sensor.

14. The electronic device of claim 1, wherein the processor is configured to:
define a form of each of the segmented signal sections using the transition point included in each of the segmented signal sections;
set a sequence of the segmented signal sections based on the form of each of the segmented signal sections; and
extract the sequence of the segmented signal sections as the feature value.

15. The electronic device of claim 1, wherein the processor is configured to independently extract the feature value from each of the segmented signal sections.

16. The electronic device of claim 1, wherein the processor is configured to extract the feature value using information of a second signal section including a gesture signal of the segmented signal sections and information of a third signal section not including the gesture signal when the bio-signal includes a signal of a predetermined pattern and the gesture signal.

17. A method for recognizing a gesture performed by an electronic device, the method comprising:
sensing a sensor signal from a user;
storing a table of a plurality of gestures, wherein for each gesture, a corresponding plurality of features are stored;
setting a first crossing point between the sensor signal and a preset reference line and a transition point of the sensor signal;
segmenting the sensor signal using at least one of the first crossing point and the transition point;
selecting a section of the sensor signal that includes one feature of the corresponding plurality of features for the plurality of gestures; and determining a specific one of the plurality of gestures based on the one feature included in the segment and the corresponding plurality features for the plurality of gestures, wherein the method further comprises:
  when a number of the segmented section is less than a preset number, changing a value of the preset reference line;
  setting a second crossing point between the sensor signal and the preset reference line that changed the value; and
  additionally segmenting the sensor signal using the second crossing point such that the number of segmented section is equal to or greater than the preset number.

* * * * *